US012795222B2

(12) United States Patent
Huh et al.

(10) Patent No.: US 12,795,222 B2
(45) Date of Patent: Nov. 10, 2026

(54) IMAGING LENS SYSTEM AND CAMERA MODULE

(71) Applicant: SAMSUNG ELECTRO-MECHANICS CO., LTD., Suwon-si (KR)

(72) Inventors: Jae Hyuk Huh, Suwon-si (KR); You Jin Jeong, Suwon-si (KR); So Mi Yang, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 67 days.

(21) Appl. No.: 18/951,284

(22) Filed: Nov. 18, 2024

(65) Prior Publication Data

US 2025/0080821 A1 Mar. 6, 2025

Related U.S. Application Data

(63) Continuation of application No. 17/900,314, filed on Aug. 31, 2022, now Pat. No. 12,192,606.

(30) Foreign Application Priority Data

Oct. 7, 2021 (KR) ........................ 10-2021-0133480
Apr. 8, 2022 (KR) ........................ 10-2022-0043821

(51) Int. Cl.
*H04N 23/55* (2023.01)
*G02B 9/10* (2006.01)
*G02B 13/00* (2006.01)

(52) U.S. Cl.
CPC ............... *H04N 23/55* (2023.01); *G02B 9/10* (2013.01); *G02B 13/0065* (2013.01)

(58) Field of Classification Search
CPC ...... H04N 23/55; G02B 9/10; G02B 13/0065; G02B 9/14; G02B 13/0035; G02B 13/02
See application file for complete search history.

(56) References Cited

U.S. PATENT DOCUMENTS 5,144,349 A * 9/1992 Kato ...................... G03B 13/12 396/379
5,231,534 A * 7/1993 Kato .................. G02B 15/1425 359/689

(Continued)

FOREIGN PATENT DOCUMENTS

CN 111308688 A 6/2020
CN 111399186 A 7/2020

(Continued)

OTHER PUBLICATIONS

Korean Office Action issued on Jul. 10, 2024, in counterpart Korean Patent Application No. 10-2022-0043821. (9 pages in English, 7 pages in Korean).

(Continued)

*Primary Examiner* — Shahbaz Nazrul
(74) *Attorney, Agent, or Firm* — NSIP Law

(57) ABSTRACT

An imaging lens system includes an optical path folding member including a forwardmost reflective surface disposed closest to an object side, a rearmost reflective surface disposed closest to an imaging plane, and a rear reflective surface disposed to form an acute angle with the rearmost reflective surface and configured to reflect light reflected by the rearmost reflective surface to the imaging plane, and a first lens group disposed on an object side of the forwardmost reflective surface or an image side of the forwardmost reflective surface, wherein an angle between a first virtual plane including the forwardmost reflective surface and a second virtual plane including the rearmost reflective surface is 15 to 27 degrees.

13 Claims, 22 Drawing Sheets

(56) References Cited

U.S. PATENT DOCUMENTS

| | | | | | |
|---|---|---|---|---|---|
| 5,323,264 | A * | 6/1994 | Kato | G02B 15/143503 359/689 |
| 6,262,852 | B1 | 7/2001 | Takahashi | |
| 6,643,062 | B1 * | 11/2003 | Kamo | G02B 17/0816 359/431 |
| 7,986,467 | B2 | 7/2011 | Tamura | |
| 8,199,400 | B2 * | 6/2012 | Shafer | G02B 21/33 359/730 |
| 8,913,316 | B2 * | 12/2014 | Dodoc | G02B 17/08 359/365 |
| 9,869,846 | B1 | 1/2018 | Bone et al. | |
| 10,311,276 | B2 | 6/2019 | Mackey et al. | |
| 2002/0176175 | A1 * | 11/2002 | Kamo | G02B 17/086 359/645 |
| 2004/0174611 | A1 * | 9/2004 | Hatakeyama | G02B 17/0852 359/676 |
| 2006/0109559 | A1 * | 5/2006 | Hudyma | G03F 7/70225 359/649 |
| 2008/0002265 | A1 * | 1/2008 | Epple | G03F 7/70341 359/731 |
| 2018/0132706 | A1 | 5/2018 | Nagae | |
| 2018/0364455 | A1 | 12/2018 | Chen et al. | |
| 2021/0048628 | A1 | 2/2021 | Shabtay et al. | |
| 2021/0063687 | A1 | 3/2021 | Huh et al. | |
| 2021/0063703 | A1 | 3/2021 | Byun et al. | |
| 2021/0096338 | A1 | 4/2021 | Saiga | |
| 2021/0103124 | A1 | 4/2021 | Chen et al. | |
| 2023/0089031 | A1 | 3/2023 | Huh et al. | |
| 2023/0132659 | A1 | 5/2023 | Shabtay et al. | |
| 2023/0400757 | A1 | 12/2023 | Goldenberg et al. | |
| 2024/0168265 | A1 | 5/2024 | Jeong et al. | |

FOREIGN PATENT DOCUMENTS

| | | | |
|---|---|---|---|
| CN | 112526709 | A | 3/2021 |
| CN | 113093366 | A | 7/2021 |
| CN | 113253436 | A | 8/2021 |
| CN | 213987006 | U | 8/2021 |
| CN | 114815164 | A | 7/2022 |
| JP | 2002-55281 | A | 2/2002 |
| JP | 2017-53890 | A | 3/2017 |
| TW | I607234 | B | 12/2017 |
| TW | I629503 | B | 7/2018 |
| WO | WO 2019/156933 | A1 | 8/2019 |
| WO | WO 2019/234506 | A1 | 12/2019 |

OTHER PUBLICATIONS

Taiwanese Office Action issued on May 4, 2023, in counterpart Taiwanese Patent Application No. 111133417. (7 pages in English, 6 pages in Chinese).

Taiwanese Office Action issued on Jul. 4, 2024, in counterpart Taiwanese Patent Application No. 112148497. (5 pages in English, 4 pages in Chinese).

Chinese Office Action Issued on Mar. 27, 2025, in Counterpart Chinese Patent Application No. 202211234678.7 (4 Pages in English, 8 Pages in Chinese).

Chinese Office Action Issued on Aug. 26, 2025, in Counterpart Chinese Patent Application No. 202211234678.7 (10 Pages in English, 11 Pages in Chinese).

Indian Office Action issued on Jul. 25, 2025, in corresponding Indian Patent Application No. 202214049959. (12 pages in English).

Taiwanese Office Action Issued on Jul. 1, 2026, in Counterpart Taiwanese Patent Application No. 114144132 (10 Pages in English, 8 Pages in Chinese).

* cited by examiner

I-I

IMAGING LENS SYSTEM AND CAMERA MODULE

CROSS-REFERENCE TO RELATED APPLICATIONS

This application is a continuation of U.S. patent application Ser. No. 17/900,314 filed on Aug. 31, 2022, now U.S. Pat. No. 12,192,606 issued on Jan. 7, 2025, which claims the benefit under 35 USC 119(a) of Korean Patent Application Nos. 10-2021-0133480 filed on Oct. 7, 2021, and 10-2022-0043821 filed on Apr. 8, 2022, in the Korean Intellectual Property Office, the entire disclosures of which are incorporated herein by reference for all purposes.

BACKGROUND

1. Field

The present disclosure relates to a telephoto imaging lens system which may be mounted on a portable electronic device.

2. Description of the Background

It may not be easy to facilitate an imaging lens system (hereinafter, a telephoto imaging lens system) having a long focal length and reduced thickness and size, and it may thus be difficult for such a system to be mounted in a small terminal. However, there has been increasing demand for functional and performance improvements of the small terminal, for example, a smartphone, which may result in an increasing need to mount a telephoto imaging lens system in such a small terminal.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes an optical path folding member including a forwardmost reflective surface disposed closest to an object side, a rearmost reflective surface disposed closest to an imaging plane, and a rear reflective surface disposed to form an acute angle with the rearmost reflective surface and configured to reflect light reflected by the rearmost reflective surface to the imaging plane, and a first lens group disposed on an object side of the forwardmost reflective surface or an image side of the forwardmost reflective surface, wherein an angle between a first virtual plane including the forwardmost reflective surface and a second virtual plane including the rearmost reflective surface is 15 to 27 degrees.

The first lens group may include a first lens and a second lens sequentially disposed from the object side.

The first lens may have a positive refractive power, and the second lens may have a negative refractive power.

V1-V2 may be greater than 30, where V1 is an Abbe number of the first lens, and V2 is an Abbe number of the second lens.

An angle between the rearmost reflective surface and the rear reflective surface may be 18 to 30 degrees.

The optical path folding member may further include a first optical path folding member including the forwardmost reflective surface, and a second optical path folding member including the rear reflective surface and the rearmost reflective surface.

The imaging lens system may further include a second lens group disposed on the object side or image side of the forwardmost reflective surface, on which the first lens group is not disposed.

The second lens group may include one or more lenses.

BFL/TTL may be less than 0.2, where BFL is a distance from an image-side surface of a rearmost lens of the first lens group to the imaging plane, and TTL is a distance from an object-side surface of a forwardmost lens of the first lens group to the imaging plane.

A camera module may include the imaging lens system, and an image sensor, wherein the imaging plane may be disposed on the image sensor.

An electronic device may include the camera module, wherein the image sensor is disposed diagonally with respect to a thickness direction of the electronic device.

In another general aspect, an imaging lens system includes a first optical path folding member having one reflective surface and having a cross-sectional shape of a right-angled triangle, a second optical path folding member having two or more reflective surfaces and having the cross-sectional shape of a right-angled triangle, a lens unit disposed to face the incident surface or exit surface of the first optical path folding member, and an imaging plane disposed to face a total reflective surface of the second optical path folding member, wherein the first optical path folding member, the second optical path folding member and the imaging plane are sequentially arranged along an optical axis of the lens unit.

The second optical path folding member may include a first reflective surface reflecting light exiting the first optical path folding member, and a second reflective surface reflecting light reflected from the first reflective surface to the first reflective surface.

An angle between the first reflective surface and the second reflective surface may be 16 to 32 degrees.

A maximum length of the incident surface of the first optical path folding member may be less than a maximum length of an exit surface of the second optical path folding member.

A distance from the exit surface of the first optical path folding member to an incident surface of the second optical path folding member may be greater than a distance from the exit surface of the second optical path folding member to the imaging plane.

The lens unit may include a first lens group disposed on an object side of the first optical path folding member.

The lens unit may include a first lens group disposed between the first optical path folding member and the second optical path folding member.

The lens unit may include a first lens group disposed on an object side of the first optical path folding member, and a second lens group disposed between the first optical path folding member and the second optical path folding member.

A camera module may include the imaging lens system.

An electronic device may include the camera module, wherein the imaging plane may be disposed on an image sensor, and the image sensor may be disposed diagonally with respect to a thickness direction of the electronic device.

In another general aspect, an imaging lens system includes an optical path folding member including a first reflective surface, a second reflective surface, and a third reflective surface configured to sequentially reflect light incident from an object side, and a first lens group disposed on the object side or image side of the first reflective surface, wherein a first angle of incidence of the first reflective surface is less than a second angle of incidence of the second reflective surface, and a third angle of incidence of the third reflective surface is less than the first angle of incidence of the first reflective surface.

The first angle of incidence and the second angle of incidence may be greater than a critical angle, respectively, and the third angle of incidence may be less than the critical angle.

The first angle of incidence and the second angle of incidence may be greater than 36 degrees and less than 90 degrees, respectively.

The third angle of incidence may be greater than 28 degrees and less than 56 degrees. An imaging plane may be disposed to face the second reflective surface.

An electronic device may include a camera module including the imaging lens system, and an image sensor including an imaging plane disposed to face the second reflective surface, wherein the image sensor may be disposed diagonally with respect to a thickness direction of the electronic device.

In another general aspect, an imaging lens system includes a first lens having positive refractive power, a second lens having negative refractive power, a convex object-side surface, and a concave image-side surface, a third lens having refractive power and a concave image-side surface, a first reflective surface, a second reflective surface, and a third reflective surface disposed in this order from an object side along an optical axis, wherein the first lens, the second lens, the third lens, the second reflective surface, and the third reflective surface are disposed in this order from an object side along the optical axis.

An angle between a first virtual plane including the first reflective surface and a second virtual plane including the second reflective surface may be 15 to 27 degrees.

The imaging lens system may further include an imaging plane disposed along the optical axis and parallel to a virtual plane including the second reflective surface.

A first angle of incidence of the first reflective surface may be less than a second angle of incidence of the second reflective surface, and a third angle of incidence of the third reflective surface may be less than the first angle of incidence of the first reflective surface.

The imaging lens system may further include a fourth lens having refractive power and disposed between the first reflective surface and the second reflective surface along the optical axis.

The imaging lens system may further include a fourth reflective surface and a fifth reflective surface disposed between the first reflective surface and the second reflective surface along the optical axis.

The optical axis may extend between the second reflective surface and the third reflective surface a plurality of times.

The third lens may be disposed between the first reflective surface and the second reflective surface along the optical axis.

An electronic device may include a camera module including the imaging lens system, and an image sensor including an imaging plane disposed to face the second reflective surface, wherein the image sensor may be disposed diagonally with respect to a thickness direction of the electronic device.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
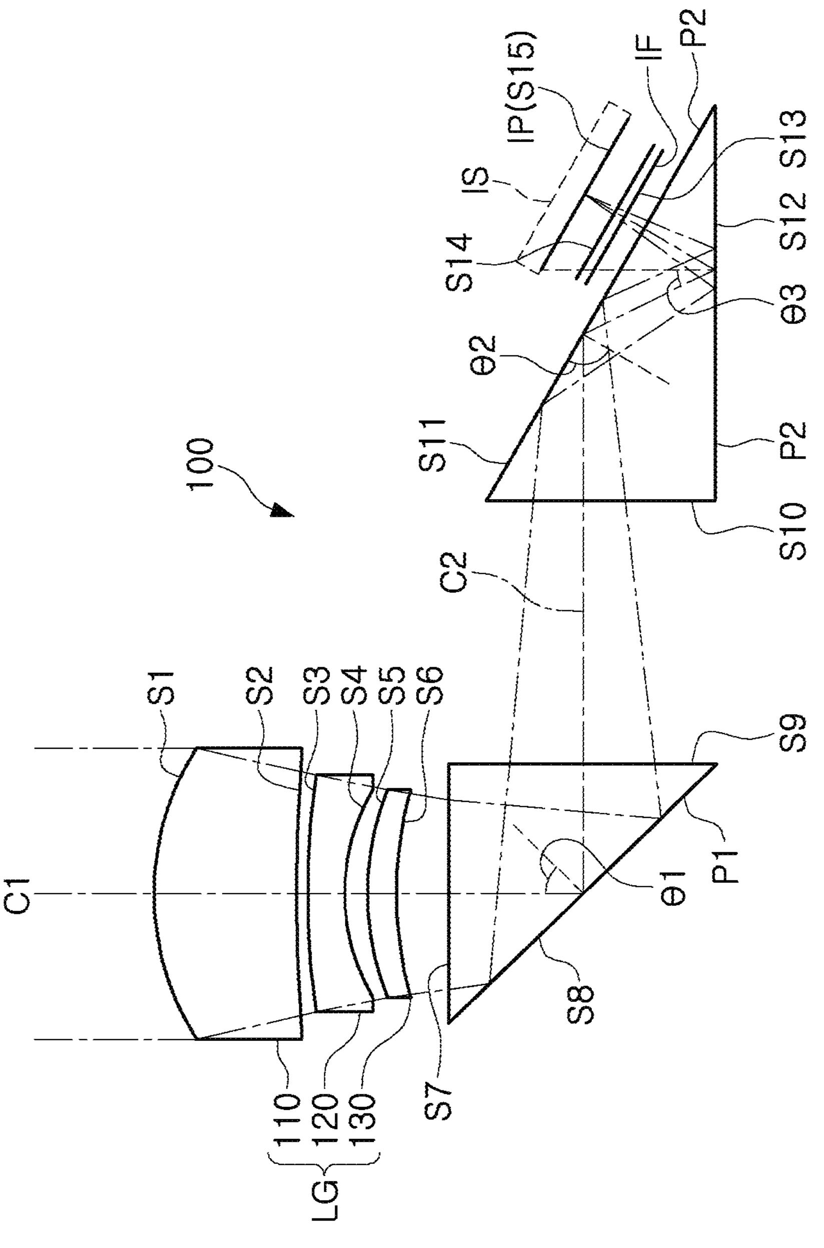
FIG. 1 is a block diagram of an imaging lens system according to a first example embodiment.

Hereinafter, while example embodiments of the present disclosure will be described, for example, with reference to the accompanying drawings, it is noted that example embodiments are not limited to the same. Terms indicating components of the present disclosure may be named in consideration of functions of each component. Therefore, the terms should not be construed as being limited technical components of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the disclosure, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one of the associated listed items and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a telephoto imaging lens system having a long focal length, which may be mounted in a small terminal.

In the present disclosure, a first lens may indicate a lens closest to an object (or a subject). In addition, the number of lenses may indicate an order in which the lenses are disposed from an object side in an optical axis direction. For example, a second lens may indicate a lens positioned second from the object side, and the third lens may indicate a lens positioned third from the object side. In the present disclosure, the radius of curvature and thickness of the lens, TTL (i.e., distance from an object-side surface of the first lens to an imaging plane), 2 ImgHT (i.e., diagonal length of the imaging plane), ImgHT (i.e., height of the imaging plane or ½ of the 2 ImgHT) and the focal length may be represented in millimeters (mm).

The thickness of the lens, a distance between the lenses, the TTL and an angle of incidence may respectively be a dimension calculated based on an optical axis of the imaging lens system. Further, in a description of a shape of the lens, one convex surface of the lens may indicate that a paraxial region of a corresponding surface is convex, and one concave surface of the lens may indicate that the paraxial region of a corresponding surface is concave. Therefore, even in the case that it is described that one surface of the lens is convex, an edge portion of the lens may be concave. Likewise, even in the case that it is described that one surface of the lens is concave, the edge portion of the lens may be convex.

The imaging lens system described herein may be mounted in a portable electronic device. For example, the imaging lens system may be mounted in a smartphone, a laptop computer, an augmented reality device, a virtual reality (VR) device, a portable game machine, or the like. However, the range and usage example of the imaging lens system described herein may not be limited to the electronic device described above. For example, the imaging lens system may be applied to an electronic device which may require high-resolution imaging while providing a narrow mounting space.

The imaging lens system described herein may reduce an external size of the imaging lens system while ensuring a long back focal length (BFL, i.e. distance from an image-side surface of a rearmost lens to the imaging plane). For example, the imaging lens system in the present disclosure may reduce the external size of the imaging lens system while securing the BFL required for implementing the telephoto imaging lens system by using a reflective member. In another example, the imaging lens system in the present disclosure may provide an imaging plane having a considerable size for implementation of a high resolution. In another example, the imaging lens system in the present disclosure may have an integrated form to be mounted in a portable terminal while securing the long focal length and the long BFL.

In the present disclosure, an optical path folding member may indicate any member which may allow light to be reflected. For example, the optical path folding member may collectively refer to all of a reflector, a prism and the like. Therefore, in the present disclosure, the reflector, the prism and the optical path folding member may all refer to the same component or interchangeable components.

An imaging lens system according to a first example embodiment of the present disclosure may include the optical path folding member and a first lens group. In the imaging lens system according to the first example embodiment, the optical path folding member may include a plurality of reflective surfaces. For example, the optical path folding member may include a forwardmost reflective surface, a rearmost reflective surface and a rear reflective surface. The forwardmost reflective surface may be disposed closest to the object side, and the rearmost reflective surface may be disposed closest to the imaging plane. The rear reflective surface may be disposed to form an acute angle with the rearmost reflective surface and reflect light reflected by the rearmost reflective surface to the imaging plane.

In the imaging lens system according to the present example embodiment, the first lens group may be disposed on an object side of the forwardmost reflective surface or an image side of the forwardmost reflective surface. However, the first lens group may not be limited to the above-described disposition. The first lens group may include a plurality of lenses. For example, the first lens group may include a first lens and a second lens sequentially disposed from the object side. In the above-described disposition, the first lens may have a positive refractive power, and the second lens may have a negative refractive power.

In the imaging lens system according to the present example embodiment, the reflective surfaces of the optical path folding member may have a unique geometrical relationship therebetween. For example, an angle between the forwardmost reflective surface and the rear reflective surface may be 15 to 27 degrees. In another example, an angle between a first virtual plane including the forwardmost reflective surface and a second virtual plane including the rearmost reflective surface may be 15 to 27 degrees. In another example, an angle between the rearmost reflective surface and the rear reflective surface may be 18 to 30 degrees.

The optical path folding member may include a plurality of members. For example, the optical path folding member may include a first optical path folding member including the forwardmost reflective surface, and a second optical path folding member including the rear reflective surface and the rearmost reflective surface. The first optical path folding member and the second optical path folding member may each have a shape of the prism. However, the first optical path folding member and the second optical path folding member may not be limited to the shape of the prisms. For example, the first optical path folding member and the second optical path folding member may each have a shape of the reflector.

The imaging lens system according to this example embodiment may include a plurality of lens groups. For example, the imaging lens system may further include a second lens group disposed on the object side or image side of the forwardmost reflective surface, on which the first lens group is not disposed. As a specific example, the imaging lens system may include the first lens group disposed on the object side of the forwardmost reflective surface and the second lens group disposed on the image side of the forwardmost reflective surface. The first lens group and the second lens group may each include one or more lenses. For example, the first lens group may include two lenses, and the second lens group may include one lens. In another example, the first lens group may include three lenses, and the second lens group may include two lenses. In another example, the first lens group may include two lenses, and the second lens group may include three lenses. However, the lenses included in the first lens group or the second lens group may not be limited to the above-described numbers.

An imaging lens system according to a second example embodiment of the present disclosure may include a first optical path folding member, a second optical path folding member and an imaging plane, sequentially arranged from the object side. In the imaging lens system according to the second example embodiment, the first optical path folding member and the second optical path folding member may each have a cross-sectional shape of a right-angled triangle. For example, the first optical path folding member and the second optical path folding member may respectively be a prism having the cross-sectional shape of a right-angled triangle. The imaging lens system according to the second example embodiment may further include a component converging (or imaging) incident light to the imaging plane. For example, the imaging lens system according to the second example embodiment may further include a lens unit disposed to face the incident surface or exit surface of the first optical path folding member. In the imaging lens system according to the second example embodiment, the imaging plane may be disposed on one side of the second optical path folding member. For example, the imaging plane may be disposed to face a hypotenuse (or total reflective surface) of the second optical path folding member.

The first optical path folding member and the second optical path folding member may each include one or more reflective surfaces. For example, the first optical path folding member may have one reflective surface, and the second optical path folding member may have two or more reflective surfaces. As a specific example, the first optical path folding member may include one total reflective surface, and the second optical path folding member may include one total reflective surface and one mirror reflective surface (or specular reflective surface). The total reflective surface of the second optical path folding member may reflect light exiting the first optical path folding member, and the specular reflective surface may reflect light exiting the total reflective surface to the total reflective surface (or the imaging plane).

In the imaging lens system according to the present example embodiment, the second optical path folding member may have a unique shape. For example, an angle between the total reflective surface and specular reflective surface of the second optical path folding member may be 16 to 32 degrees. As a specific example, the angle between the total reflective surface and specular reflective surface of the second optical path folding member may be 30 or 18 degrees.

In the imaging lens system according to the present example embodiment, the second optical path folding member may enable a plurality of internal reflections. In more detail, the second optical path folding member may allow an even number of internal reflections to be made. For example, the second optical path folding member may allow two or four internal reflections.

In the imaging lens system according to the present example embodiment, an angle (θp2) between the first reflective surface and second reflective surface of the second optical path folding member may be expressed by the following conditional expression.

$$\theta p2 = 90/(2n+1),\ 2n = N$$

In the above conditional expression, "n" may indicate a positive integer, and "N" may indicate the number of internal reflections of the second optical path folding member. For example, the angle (θp2) may be 30 degrees when the number of internal reflections of the second optical path folding member is two times. In another example, the angle (θp2) may be 18 degrees when the number of internal reflections of the second optical path folding member is four times.

The number of internal reflections of the second optical path folding member according to the present example embodiment may be six times or more. However, the number of internal reflections of the second optical path folding member may not exceed four times. In more detail, the angle (θp2) may be reduced to 12.9 degrees or less when the number of internal reflections of the second optical path folding member is increased to six times or more. In this case, an amount of light incident to the second optical path folding member may also be reduced, and the imaging lens system may thus have a significantly reduced resolution. Accordingly, the number of internal reflections of the second optical path folding member may be two or four times.

In the imaging lens system according to the present example embodiment, the first optical path folding member and the second optical path folding member may have a unique size relationship therebetween. For example, a maximum length of the incident surface of the first optical path folding member may be less than a maximum length of an exit surface of the second optical path folding member. In another example, the total reflective surface of the first optical path folding member may be smaller than the total reflective surface of the second optical path folding member.

In the imaging lens system according to the present example embodiment, the second optical path folding member may be disposed adjacently to the imaging plane. For example, a distance from the exit surface of the second optical path folding member to the imaging plane may be less than a distance from the exit surface of the first optical path folding member to an incident surface of the second optical path folding member.

In the imaging lens system according to the present example embodiment, the lens unit may include a plurality of lens groups. For example, the lens unit may include a first lens group disposed on an object side of the first optical path folding member and a second lens group disposed between the first optical path folding member and the second optical path folding member.

An imaging lens system according to a third example embodiment of the present disclosure may include an optical path folding member and a first lens group. In the imaging lens system according to the present example embodiment, the optical path folding member may include a unique configuration. For example, the optical path folding member may include a first reflective surface, a second reflective surface and a third reflective surface sequentially reflecting light incident from the object side. The first reflective surface, the second reflective surface and the third reflective surface may have a predetermined size relationship therebetween, based on an angle of incidence. For example, a first angle of incidence of the first reflective surface may be less than a second angle of incidence of the second reflective surface, and a third angle of incidence of the third reflective surface may be less than the first angle of incidence of the first reflective surface.

The first angle of incidence to the third angle of incidence may each have a predetermined size. For example, the first angle of incidence and the second angle of incidence may be greater than 36 degrees and less than 90 degrees, respectively. In another example, the third angle of incidence may be greater than 28 degrees and less than 56 degrees.

The imaging lens system according to the present example embodiment may have an imaging plane formed at a specific position. For example, in the imaging lens system according to the present example embodiment, the imaging plane may be disposed to face the second reflective surface of the optical path folding member.

An imaging lens system according to a fourth example embodiment of the present disclosure may satisfy one or more of the following conditional expressions. However, only the imaging lens system according to the fourth example embodiment may not satisfy the following conditional expressions. For example, the imaging lens system according to the first to third example embodiments described above may satisfy one or more of the following conditional expressions.

$$BFL/TTL < 0.9$$

$$30 < V1 - V2$$

$$10\text{ mm} < f$$

$$15\text{ mm} < TTL$$

In the above conditional expressions, BFL may indicate a distance from an image-side surface of a lens (hereinafter, rearmost lens) disposed closest to an imaging plane to the imaging plane, TTL may indicate a distance from an object-side surface of a lens (hereinafter, forwardmost lens or first lens) disposed closest to an object (or subject) to the imaging plane, V1 may indicate an Abbe number of the first lens (or forwardmost lens), V2 may indicate an Abbe number of the second lens (or lens closest to an image side of the first lens), and "f" is a focal length of the imaging lens system.

The imaging lens system according to the present disclosure may satisfy the above-described conditional expressions in a more limited form as follows.

$$0.4 < BFL/TTL < 0.9$$

$$30 < V1 - V2 < 36$$

$$12\text{ mm} < f < 24\text{ mm}$$

$$15\text{ mm} < TTL < 26\text{ mm}$$

An imaging lens system according to a fifth example embodiment of the present disclosure may satisfy one or more of the following conditional expressions separately from the above-described conditional expressions.

$$0.8 < TTL/f < 1.5$$

$$1.8 < TTL/f1 < 2.6$$

$$-3.4 < TTL/f2 < -0.2$$

$$-1.4 < TTL/f3 < 1.4$$

$$-1.0 < TTL/f4 < 1.0$$

$$0.4 < BFL/f < 1.0$$

$$0.9 < BFL/f1 < 2.1$$

$$-3.0 < BFL/f2 < -0.1$$

$$-1.0 < BFL/f3 < 1.0$$

$$-0.3 < BFL/f4 < 0.4$$

$$5.0\ \text{mm} < PID < 8.0\ \text{mm}$$

$$2.3 < PID/ImgHT < 6.0$$

In the above conditional expression, f1 may indicate a focal length of a first lens, f2 may indicate a focal length of a second lens, f3 may indicate a focal length of a lens (hereinafter, third lens) disposed closest to an image-side surface of the second lens, f4 may indicate a focal length of a lens (hereinafter, fourth lens) disposed closest to an image-side surface of the third lens, PID may indicate an optical path distance from an incident surface of the optical path folding member disposed closest to the imaging plane to its exit surface, and ImgHT may indicate a height of the imaging plane.

The imaging lens system according to the first to fourth example embodiments may include one or more lenses having the following characteristics, if necessary. For example, the imaging lens system according to the first example embodiment may include one of the first to fourth lenses having the following characteristics. In another example, the imaging lens system according to the second example embodiment may include two or more of the first to fourth lenses having the following characteristics. However, the imaging lens system according to the above-described example embodiments may not necessarily include the lens having the following characteristics.

The first lens may have a refractive power. For example, the first lens may have positive refractive power. The first lens may have one convex surface. For example, the first lens may have a convex object-side surface. The first lens may have a predetermined refractive index. For example, the refractive index of the first lens may be 1.5 or more. As a specific example, the refractive index of the first lens may be greater than 1.5 and less than 1.6. The first lens may have a predetermined Abbe number. For example, the Abbe number of the first lens may be 50 or more. As a specific example, the Abbe number of the first lens may be greater than 52 and less than 62. The first lens may have a predetermined focal length. For example, the focal length of the first lens may be determined in a range of 7.6 mm to 10.0 mm.

The second lens may have refractive power. For example, the second lens may have negative refractive power. The second lens may have one convex surface. For example, the second lens may have a convex object-side surface. The second lens may have a predetermined refractive index. For example, the refractive index of the second lens may be 1.6 or more. As a specific example, the refractive index of the second lens may be greater than 1.6 and less than 1.7. The second lens may have a predetermined Abbe number. For example, the Abbe number of the second lens may be 20 or more. As a specific example, the Abbe number of the second lens may be greater than 20 and less than 30. The second lens may have a predetermined focal length. For example, the focal length of the second lens may be determined in a range of –60 mm to –6.0 mm.

The third lens may have refractive power. For example, the third lens may have positive or negative refractive power. The third lens may have one concave surface. For example, the third lens may have a concave image-side surface. The third lens may have a predetermined refractive index. For example, the refractive index of the third lens may be 1.5 or more. As a specific example, the refractive index of the third lens may be greater than 1.5 and less than 1.7. The third lens may have a predetermined Abbe number. For example, the Abbe number of the third lens may be 18 or more. As a specific example, the Abbe number of the third lens may be greater than 18 and less than 60. The third lens may have a predetermined focal length. For example, the focal length of the third lens may be less than −10 mm or greater than 10 mm.

The fourth lens may have refractive power. For example, the fourth lens may have positive or negative refractive power. The fourth lens may have one convex surface. For example, the fourth lens may have a convex object-side surface. The fourth lens may have a predetermined refractive index. For example, the refractive index of the fourth lens may be 1.5 or more. As a specific example, the refractive index of the fourth lens may be greater than 1.5 and less than 1.6. The fourth lens may have a predetermined Abbe number. For example, the Abbe number of the fourth lens may be 50 or more. As a specific example, the Abbe number of the fourth lens may be greater than 50 and less than 60. The fourth lens may have a predetermined focal length. For example, the focal length of the fourth lens may be less than –20 mm or greater than 20 mm.

Aspherical surfaces of the first to fourth lenses may be expressed by Equation 1. In Equation 1, "c" may indicate an inverse of a radius of curvature of a corresponding lens, "k" may indicate a conic constant, "r" may indicate a distance from a certain point on the aspherical surface of the lens to the optical axis, A to H and J may indicate aspherical constants, and "Z" (or SAG) may indicate a height from the certain point on the aspherical surface of the lens to a vertex of the aspherical surface of the corresponding lens in the optical axis direction.

Equation 1

$$Z = \frac{cr^2}{1 + \sqrt{1 - (1+k)c^2r^2}} + Ar^4 + Br^6 + Cr^8 + Dr^{10} + Er^{12} + Fr^{14} + Gr^{16} + Hr^{18} + Jr^{20}$$

An electronic device according to a first example embodiment of the present disclosure may have a reduced thickness to be easily carried or stored. For example, the electronic device according to an example embodiment may be a smartphone, a laptop computer, or the like. The electronic device according to an example embodiment may include a camera module having a long focal length while capable of implementing a high resolution. For example, the electronic device may be equipped with the camera module including one of the imaging lens systems according to the above-described first to fourth example embodiments. However, the imaging lens system included in the camera module may not be limited to the imaging lens system according to the above-described first to fourth example embodiments.

An electronic device according to a second example embodiment may include a camera module having a unique shape. For example, the camera module may include an image sensor disposed to have an inclination with respect to an output unit (e.g., liquid crystal screen) of the electronic device. As a specific example, a board on which the image sensor is mounted may be disposed to have an inclination of 16 to 32 degrees with respect to the output unit of the electronic device.

Hereinafter, example embodiments in the present disclosure will now be described in detail with reference to the accompanying drawings.

First, the imaging lens system according to the first example embodiment is described with reference to FIG. 1.

An imaging lens system 100 according to the present example embodiment may include a lens group LG, a first prism P1 and a second prism P2. However, the components of the imaging lens system 100 are not limited to the above-described members. For example, the imaging lens system 100 may further include a filter IF and an imaging plane IP. The lens group LG, the first prism P1 and the second prism P2 may be sequentially arranged from the object side. For example, the lens group LG may be disposed on an object side of the first prism P1, and the second prism P2 may be disposed on an image side of the first prism P1. However, the lens group LG, the first prism P1 and the second prism P2 are not limited to the above-described arrangement. For example, the lens group LG may be disposed on the image side of the first prism P1, that is, between the first prism P1 and the second prism P2.

Next, the above-described components are described in order.

The lens group LG may include a plurality of lenses. For example, the lens group LG may include a first lens 110, a second lens 120 and a third lens 130 sequentially arranged from the object side. The first lens 110 to the third lens 130 may be arranged at a predetermined interval. For example, an image-side surface of the first lens 110 may not be in contact with an object-side surface of the second lens 120, and an image-side surface of the second lens 120 may not be in contact with an object-side surface of the third lens 130. However, the first lens 110 to the third lens 130 may not necessarily be arranged so as not to be in contact with one another. For example, the image-side surface of the first lens 110 may be in contact with the object-side surface of the second lens 120, or the image-side surface of the second lens 120 may be in contact with the object-side surface of the third lens 130.

Next, characteristics of the first lens 110 to the third lens 130 are described.

The first lens 110 may have refractive power. For example, the first lens 110 may have the positive refractive power. The first lens 110 may have the convex object-side surface and the concave image-side surface. The first lens 110 may have a spherical surface. For example, both surfaces of the first lens 110 may be spherical. The second lens 120 may have refractive power. For example, the second lens 120 may have negative refractive power. The second lens 120 may have the convex object-side surface and the concave image-side surface. The second lens 120 may have an aspherical surface. For example, both surfaces of the second lens 120 may be aspherical. The third lens 130 may have refractive power. For example, the third lens 130 may have the positive refractive power. The third lens 130 may have the convex object-side surface and the concave image-side surface. The third lens 130 may have an aspherical surface. For example, both surfaces of the third lens 130 may be aspherical.

Next, the first prism P1 and the second prism P2 which are the optical path folding members are described. For reference, the prism described below is one type of the optical path folding member described in the claims, and may be changed to another member.

The first prism P1 and the second prism P2 may be disposed so that light incident through the first lens 110 to the third lens 130 is imaged on an imaging plane IP. For example, the first prism P1 and the second prism P2 may be sequentially disposed along an optical path between the third lens 130 and the imaging plane IP.

The first prism P1 may have a triangular cross section. For example, the cross section of the first prism cut in an optical path direction may have a right-angled triangle shape. An incident surface S7 of the first prism P1 and a projection surface S9 of the first prism P1 may form a substantially right angle. For example, the incident surface S7 of the first prism P1 and the projection surface S9 of the first prism P1 may respectively be formed in a portion other than a hypotenuse in the cross-sectional shape of the right-angled triangle.

The first prism P1 may include a reflective surface. For example, the first prism P1 may include one first reflective surface S8. The first reflective surface S8 may enable total reflection. For example, a first angle of incidence θ1 of the first reflective surface S8 may be greater than a critical angle of the first reflective surface S8. In more detail, the first angle of incidence θ1 may be 45 degrees which is greater than 41.2 degrees, that is, the critical angle of the first reflective surface S8. The first prism P1 configured as described above may reflect light incident from the third lens 130 to the second prism P2 as it is.

The second prism P2 may have the triangular cross section. For example, the cross section of the second prism cut in the optical path direction may have the right-angled triangle shape. The second prism P2 may include a plurality of reflective surfaces. For example, the second prism P2 may include a second reflective surface S11 and a third reflective surface S12.

The second prism P2 may enable total reflection and specular reflection. For example, the second reflective surface S11 of the second prism P2 may enable total reflection, and the third reflective surface S12 of the second prism P2 may enable specular reflection or mirror reflection. As a specific example, a second angle of incidence θ2 of the second reflective surface S11 may be greater than a critical angle of the second reflective surface S11, and a third angle of incidence θ3 of the third reflective surface S12 may be less than a critical angle of the third reflective surface S12.

The second reflective surface S11 and the third reflective surface S12 may form an acute angle. For example, an angle θp2 between the second reflective surface S11 and the third reflective surface S12 may be 16 to 32 degrees. The second reflective surface S11 and the third reflective surface S12 may each have a predetermined angle between an incident surface S10 of the second prism P2. For example, the angle between the second reflective surface S11 and the incident surface S10 of the second prism P2 may be 58 to 74 degrees, and the angle between the third reflective surface S12 and the incident surface S10 of the second prism P2 may be approximately 90 degrees.

The second prism P2 may enable a plurality of internal reflections. For example, light incident through the incident surface S10 of the second prism P2 may be reflected by the second reflective surface S11 and then re-reflected by the third reflective surface S12.

One surface of the second prism P2 may enable both reflection and projection. For example, the second reflective surface S11 of the second prism P2 may transmit light incident from the third reflective surface S12 while reflecting light incident through the incident surface S10 to the third reflective surface S12.

The first to third reflective surfaces S8, S11 and S12 of the first prism P1 and the second prism P2 may have a predetermined size relationship therebetween. For example, the first angle of incidence θ1 may be less than the second angle of incidence θ2, and the third angle of incidence θ3 may be less than the first angle of incidence θ1.

The first prism P1 and the second prism P2 which are configured as described above may make the imaging lens system 100 small and integrated by folding the optical path connected from the object side to the imaging plane. For example, the first prism P1 may fold the optical path extended along a first optical axis C1 in a direction of a second optical axis C2 intersecting the first optical axis C1, thereby reducing a length of the imaging lens system 100 in a direction of the first optical axis C1. In another example, the second prism P2 may fold the optical path extended along the second optical axis C2 twice or more through total reflection and the mirror reflection, thereby reducing a length of the imaging lens system 100 in the direction of the second optical axis C2.

The filter IF and the imaging plane IP may be disposed on one side of the second prism P2. For example, the filter IF and the imaging plane IP may be disposed to face a hypotenuse having a largest length in the cross-sectional shape of the second prism P2. As a specific example, the filter IF and the imaging plane IP may be disposed to face the second reflective surface S11 of the second prism P2.

The filter IF may block light of a specific wavelength. For example, the filter IF according to the present example embodiment may block infrared light. However, a type of light blocked by the filter IF is not limited to the infrared light. For example, the filter IF may block ultraviolet or visible light.

The imaging plane IP may be positioned at a point where light reflected by the third reflective surface S12 converges or forms an image, and may be formed by an image sensor IS or the like. For example, the imaging plane IP may be formed on or inside the image sensor IS.

Figure 2:
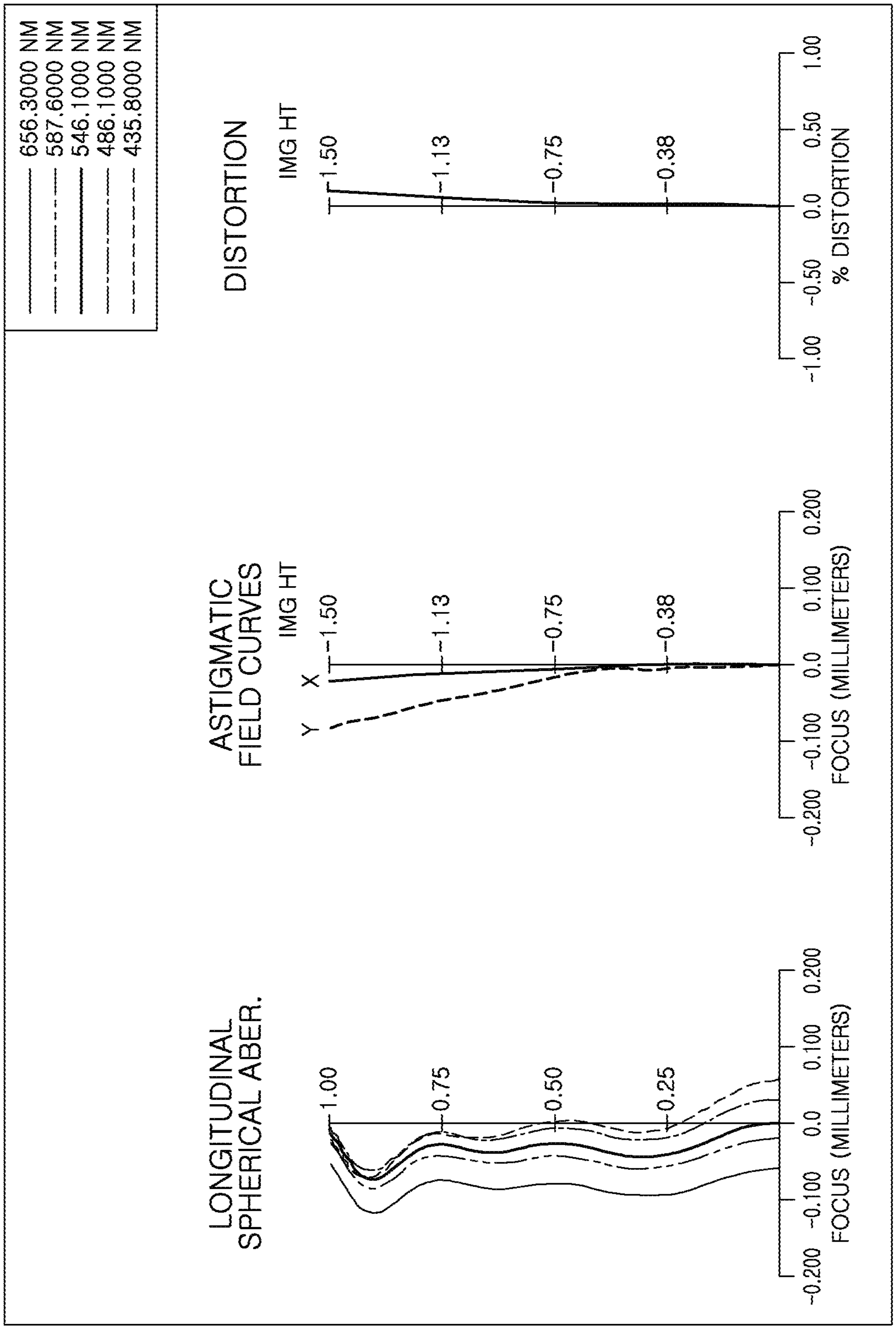
FIG. 2 is an aberration curve of the imaging lens system illustrated in FIG. 1.

The imaging lens system 100 configured as above may show aberration characteristics illustrated in FIG. 2. Tables 1 and 2 show the lens characteristics and aspheric values, respectively, of the imaging lens system according to the present example embodiment.

TABLE 1

| Surface no. | Component | Radius of curvature | Thickness/ Distance | Refractive index | Abbe number |
|---|---|---|---|---|---|
| S1 | First lens | 5.0492 | 2.762 | 1.585 | 59.5 |
| S2 | | 44.3097 | 0.206 | | |
| S3 | Second lens | 19.2117 | 0.735 | 1.621 | 26.0 |
| S4 | | 3.6554 | 0.413 | | |

TABLE 1-continued

| Surface no. | Component | Radius of curvature | Thickness/ Distance | Refractive index | Abbe number |
|---|---|---|---|---|---|
| S5 | Third lens | 5.5960 | 0.588 | 1.679 | 19.2 |
| S6 | | 8.9660 | 1.000 | | |
| S7 | First prism | Infinity | 2.500 | 1.519 | 64.2 |
| S8 | | Infinity | 2.500 | 1.519 | 64.2 |
| S9 | | Infinity | 5.000 | | |
| S10 | Second prism | Infinity | 3.000 | 1.519 | 64.2 |
| S11 | | Infinity | 3.000 | 1.519 | 64.2 |
| S12 | | Infinity | 1.500 | 1.519 | 64.2 |
| S11 | | Infinity | 0.500 | | |
| S13 | Filter | Infinity | 0.210 | 1.519 | 64.2 |
| S14 | | Infinity | 0.646 | | |
| S15 | Imaging plane | Infinity | 0.037 | | |

TABLE 2

| Surface no. | S1 | S2 | S3 | S4 | S5 | S6 |
|---|---|---|---|---|---|---|
| K | 0 | 0 | 3.847E+01 | 2.078E−01 | −6.915E−01 | 9.200E+00 |
| A | 0 | 0 | 1.319E−02 | 1.729E−02 | 5.342E−03 | 1.012E−03 |
| B | 0 | 0 | 1.377E−03 | −7.004E−04 | −2.741E−04 | −2.020E−04 |
| C | 0 | 0 | 3.400E−04 | −1.445E−04 | 2.866E−05 | −7.257E−05 |
| D | 0 | 0 | 3.735E−04 | 1.419E−04 | −3.251E−05 | −1.573E−04 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Next, modified examples of the imaging lens system according to the first example embodiment are described with reference to FIGS. 3 and 4. For reference, in the following description, the same components as those of the above-described example embodiment are denoted by the same reference numerals as those of the above-described example embodiment and detailed descriptions of these components are omitted.

First, an imaging lens system 101 according to a first modified example is described with reference to FIG. 3.

Figure 3:
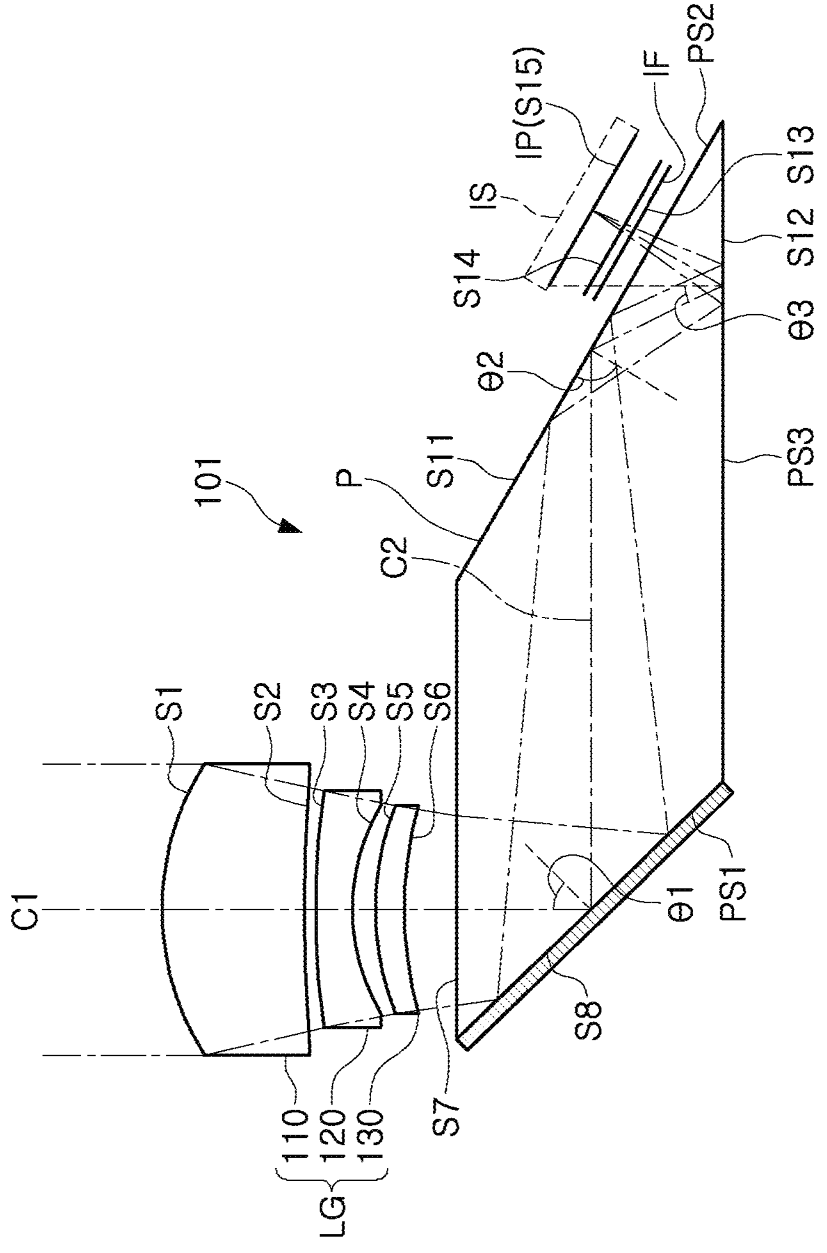
FIG. 3 is a configuration diagram of a modified example of the imaging lens system illustrated in FIG. 1.

The imaging lens system 101 according to the first modified example may include an optical path folding member P in which the first prism and the second prism are integrally formed with each other as illustrated in FIG. 3. For example, the optical path folding member P may have the first prism P1 and second prism P2 of FIG. 1 bonded with each other.

The optical path folding member P may include three reflective surfaces. For example, the optical path folding member P may include a first reflective surface PS1, a second reflective surface PS2 and a third reflective surface PS3. The first reflective surface PS1, the second reflective surface PS2 and the third reflective surface PS3 may be sequentially arranged along the optical path.

The optical path folding member P may enable both total reflection and mirror reflection (or specular reflection). For example, the first reflective surface PS1 and the second reflective surface PS2 may enable total reflection, and the third reflective surface PS3 may enable the mirror reflection.

The first reflective surface PS1, the second reflective surface PS2 and the third reflective surface PS3 may each have a predetermined angle of incidence. For example, a first angle of incidence θ1 of the first reflective surface PS1 may be 45 degrees, a second angle of incidence θ2 of the second reflective surface PS2 may be 60 degrees, and a third angle of incidence θ3 of the third reflective surface PS3 may be 30 degrees.

The imaging lens system 101 configured as above may replace a plurality of prisms with one optical path folding member P, thereby simplifying an assembly process of the imaging lens system 101.

Next, an imaging lens system 102 according to a second modified example is described with reference to FIG. 4.

The imaging lens system 102 according to the second modified example may implement a considerably long back focal length. For example, the imaging lens system 102 according to this modified example may include the second prism P2 enabling the internal reflections twice or more as illustrated in FIG. 4. As a specific example, the second prism P2 may enable the internal reflections four times. For reference, the angle θp2 between the second reflective surface S11 and the third reflective surface S12 may be 18 degrees.

The imaging lens system 102 configured as described above may have the back focal length increased by the number of internal reflections enabled by the second prism P2 as described above, thereby improving a telephoto characteristic of the imaging lens system 102.

Figure 5:
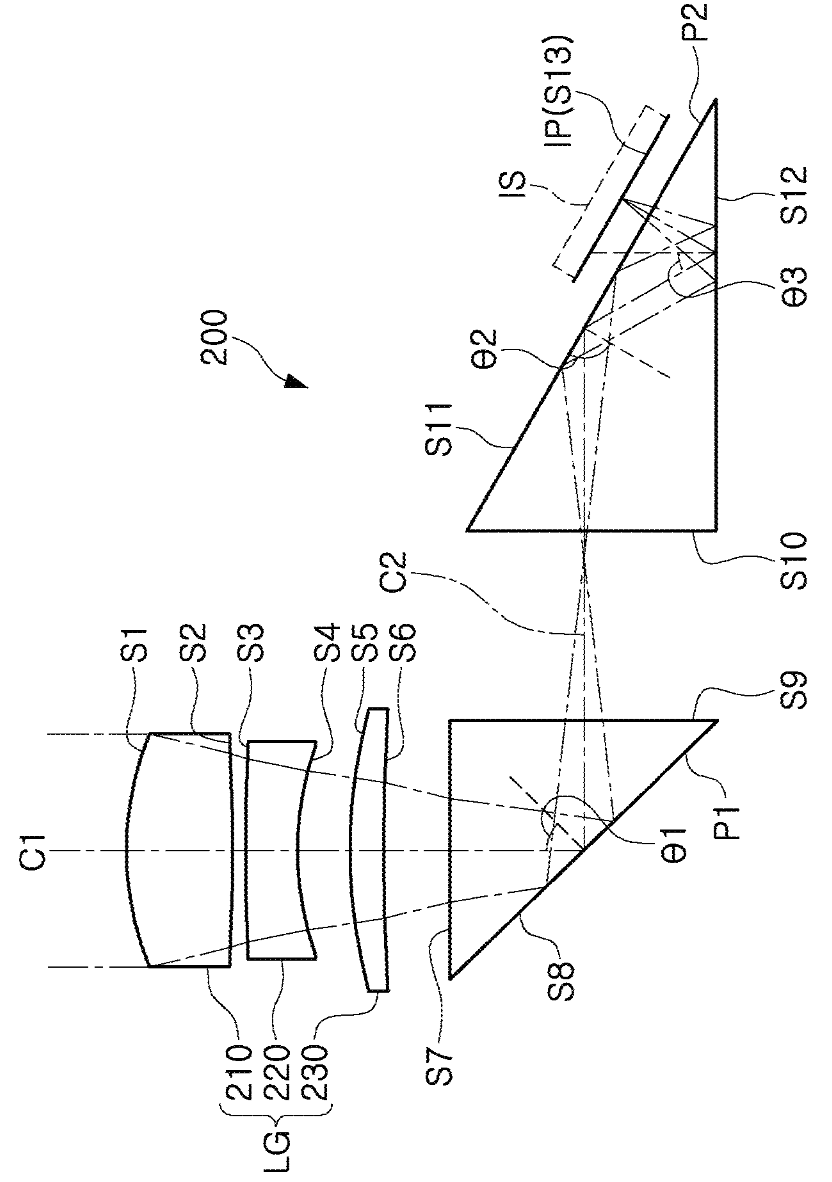
FIG. 5 is a block diagram of an imaging lens system according to a second example embodiment.

Next, the imaging lens system according to the second example embodiment is described with reference to FIG. 5.

An imaging lens system 200 according to the present example embodiment may include a lens group LG, the first prism P1 and the second prism P2. However, the components of the imaging lens system 200 are not limited to the above-described members. For example, the imaging lens system 200 may further include the filter IF and the imaging plane IP. The lens group LG, the first prism P1 and the second prism P2 may be sequentially arranged from the object side. For example, the lens group LG may be disposed on the object side of the first prism P1, and the second prism P2 may be disposed on the image side of the first prism P1. However, the lens group LG, the first prism P1 and the second prism P2 are not limited to the above-described arrangement. For example, the lens group LG may be disposed on the image side of the first prism P1, that is, between the first prism P1 and the second prism P2.

Next, the above-described components are described in order.

The lens group LG may include a plurality of lenses. For example, the lens group LG may include a first lens 210, a second lens 220 and a third lens 230 sequentially arranged from the object side. The first lens 210 to the third lens 230 may be arranged at a predetermined interval. For example, an image-side surface of the first lens 210 may not be in contact with an object-side surface of the second lens 220, and an image-side surface of the second lens 220 may not be in contact with an object-side surface of the third lens 230. However, the first lens 210 to the third lens 230 may not necessarily be arranged so as not to be in contact with one another. For example, the image-side surface of the first lens 210 may be in contact with the object-side surface of the second lens 220, or the image-side surface of the second lens 220 may be in contact with the object-side surface of the third lens 230.

Next, characteristics of the first lens 210 to the third lens 230 are described.

The first lens 210 may have refractive power. For example, the first lens 210 may have the positive refractive power. The first lens 210 may have the convex object-side surface and the convex image-side surface. The first lens 210 may have the spherical surface. For example, both surfaces of the first lens 210 may be spherical. The second lens 220 may have refractive power. For example, the second lens 220 may have negative refractive power. The second lens 220 may have the convex object-side surface and the concave image-side surface. The second lens 220 may have the aspherical surface. For example, both surfaces of the second lens 220 may be aspherical. The third lens 230 may have refractive power. For example, the third lens 230 may have the positive refractive power. The third lens 230 may have the convex object-side surface and the concave image-side surface. The third lens 230 may have the aspherical surface. For example, both surfaces of the third lens 230 may be aspherical.

Next, the first prism P1 and the second prism P2 which are the optical path folding members are described. For reference, the prism described below is one type of the optical path folding member described in the claims, and may be changed to another member.

The first prism P1 and the second prism P2 may be disposed so that light incident through the first lens 210 to the third lens 230 is imaged on the imaging plane IP. For example, the first prism P1 and the second prism P2 may be sequentially disposed along the optical path between the third lens 230 and the imaging plane IP.

The first prism P1 may have a triangular cross section. For example, the cross section of the first prism cut in the optical path direction may have the right-angled triangle shape. The incident surface S7 of the first prism P1 and the projection surface S9 of the first prism P1 may form the substantially right angle. For example, the incident surface S7 of the first prism P1 and the projection surface S9 of the first prism P1 may respectively be formed in a portion other than the hypotenuse in the cross-sectional shape of the right-angled triangle.

The first prism P1 may include the reflective surface. For example, the first prism P1 may include one first reflective surface S8. The first reflective surface S8 may enable total reflection. For example, the first angle of incidence θ1 of the first reflective surface S8 may be greater than the critical angle of the first reflective surface S8. In more detail, the first angle of incidence θ1 may be 45 degrees which is greater than 41.2 degrees, that is, the critical angle of the first reflective surface S8. The first prism P1 configured as described above may reflect light incident from the third lens 230 to the second prism P2 as it is.

The second prism P2 may have the triangular cross section. For example, the cross section of the second prism cut in the optical path direction may have the right-angled triangle shape. The second prism P2 may include the plurality of reflective surfaces. For example, the second prism P2 may include the second reflective surface S11 and the third reflective surface S12.

The second prism P2 may enable total reflection and specular reflection. For example, the second reflective surface S11 of the second prism P2 may enable total reflection, and the third reflective surface S12 of the second prism P2 may enable specular reflection or mirror reflection. As a specific example, the second angle of incidence θ2 of the second reflective surface S11 may be greater than the critical angle of the second reflective surface S11, and the third angle of incidence θ3 of the third reflective surface S12 may be less than the critical angle of the third reflective surface S12.

The second reflective surface S11 and the third reflective surface S12 may form the acute angle. For example, the angle θp2 between the second reflective surface S11 and the third reflective surface S12 may be 16 to 32 degrees. The second reflective surface S11 and the third reflective surface S12 may have the predetermined angle between the incident surface S10 of the second prism P2. For example, the angle between the second reflective surface S11 and the incident surface S10 of the second prism P2 may be 58 to 74 degrees, and the angle between the third reflective surface S12 and the incident surface S10 of the second prism P2 may be approximately 90 degrees.

The second prism P2 may enable the plurality of internal reflections. For example, light incident through the incident surface S10 of the second prism P2 may be reflected by the second reflective surface S11 and then re-reflected by the third reflective surface S12.

One surface of the second prism P2 may enable both the reflection and projection. For example, the second reflective surface S11 of the second prism P2 may transmit light incident from the third reflective surface S12 while reflecting light incident through the incident surface S10 to the third reflective surface S12.

The first to third reflective surfaces S8, S11 and S12 of the first prism P1 and the second prism P2 may have the predetermined size relationship therebetween. For example, the first angle of incidence θ1 may be less than the second angle of incidence θ2, and the third angle of incidence θ3 may be less than the first angle of incidence θ1.

The first prism P1 and the second prism P2 which are configured as described above may make the imaging lens system 200 small and integrated by folding the optical path connected from the object side to the imaging plane. For example, the first prism P1 may fold the optical path extended along the first optical axis C1 in the direction of the second optical axis C2 intersecting the first optical axis C1, thereby reducing a length of the imaging lens system 200 in the direction of the first optical axis C1. In another example, the second prism P2 may fold the optical path extended along the second optical axis C2 twice or more through total reflection and the mirror reflection, thereby reducing a length of the imaging lens system 200 in the direction of the second optical axis C2.

The imaging plane IP may be disposed on one side of the second prism P2. For example, the imaging plane IP may be disposed to face the hypotenuse having the largest length in the cross-sectional shape of the second prism P2. As a specific example, the imaging plane IP may be disposed to face the second reflective surface S11 of the second prism P2.

The imaging plane IP may be positioned at the point where light reflected by the third reflective surface S12 converges or forms an image, and may be formed by the image sensor IS or the like. For example, the imaging plane IP may be formed on or inside the image sensor IS.

In the imaging lens system 200 according to the present example embodiment, a filter (not illustrated) may be integrally formed on one surface of the second prism P2. For example, the filter may be integrally formed on the incident surface S10 or projection surface S11 of the second prism P2. As a specific example, the filter may be manufactured in a shape of a film and attached to the incident surface S10 or projection surface S11 of the second prism P2.

Figure 6:
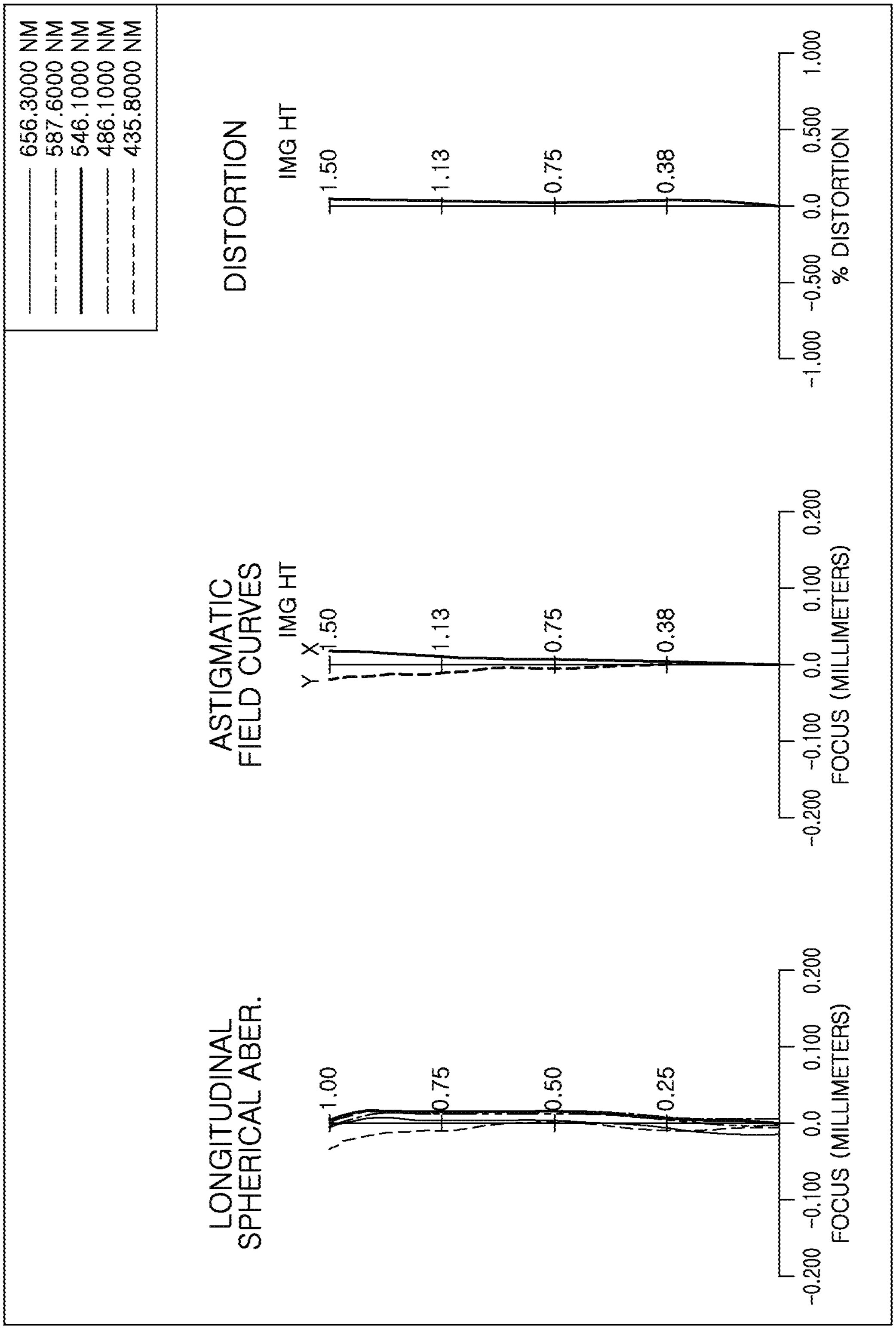
FIG. 6 is an aberration curve of the imaging lens system illustrated in FIG. 5.

The imaging lens system 200 configured as above may show aberration characteristics illustrated in FIG. 6. Tables 3 and 4 show the lens characteristics and aspheric values, respectively, of the imaging lens system according to the present example embodiment.

TABLE 3

| Surface no. | Component | Radius of curvature | Thickness/ Distance | Refractive index | Abbe number |
|---|---|---|---|---|---|
| S1 | First lens | 4.6433 | 1.617 | 1.537 | 55.7 |
| S2 | | −78.1022 | 0.231 | | |
| S3 | Second lens | 21.7719 | 0.803 | 1.646 | 23.5 |
| S4 | | 3.9441 | 0.849 | | |
| S5 | Third lens | 8.7192 | 0.500 | 1.669 | 20.3 |
| S6 | | 35.4094 | 1.000 | | |
| S7 | First prism | Infinity | 2.000 | 1.519 | 64.2 |
| S8 | | Infinity | 2.000 | 1.519 | 64.2 |
| S9 | | Infinity | 3.000 | | |
| S10 | Second prism | Infinity | 3.000 | 1.519 | 64.2 |
| S11 | | Infinity | 2.500 | 1.519 | 64.2 |
| S12 | | Infinity | 1.250 | 1.519 | 64.2 |
| S11 | | Infinity | 0.470 | | |
| S13 | Imaging plane | Infinity | 0.002 | | |

TABLE 4

| Surface no. | S1 | S2 | S3 | S4 | S5 | S6 |
|---|---|---|---|---|---|---|
| K | 0 | 0 | 3.981E+01 | 2.311E−01 | −2.494E+00 | 7.892E+01 |
| A | 0 | 0 | 1.268E−02 | 1.661E−02 | 7.014E−03 | −4.885E−03 |
| B | 0 | 0 | 1.083E−03 | −1.451E−04 | −5.181E−04 | −7.813E−04 |
| C | 0 | 0 | 2.509E−05 | 5.160E−04 | 3.048E−05 | 3.334E−04 |
| D | 0 | 0 | 4.678E−04 | 7.040E−07 | 8.988E−06 | −5.540E−04 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 7:
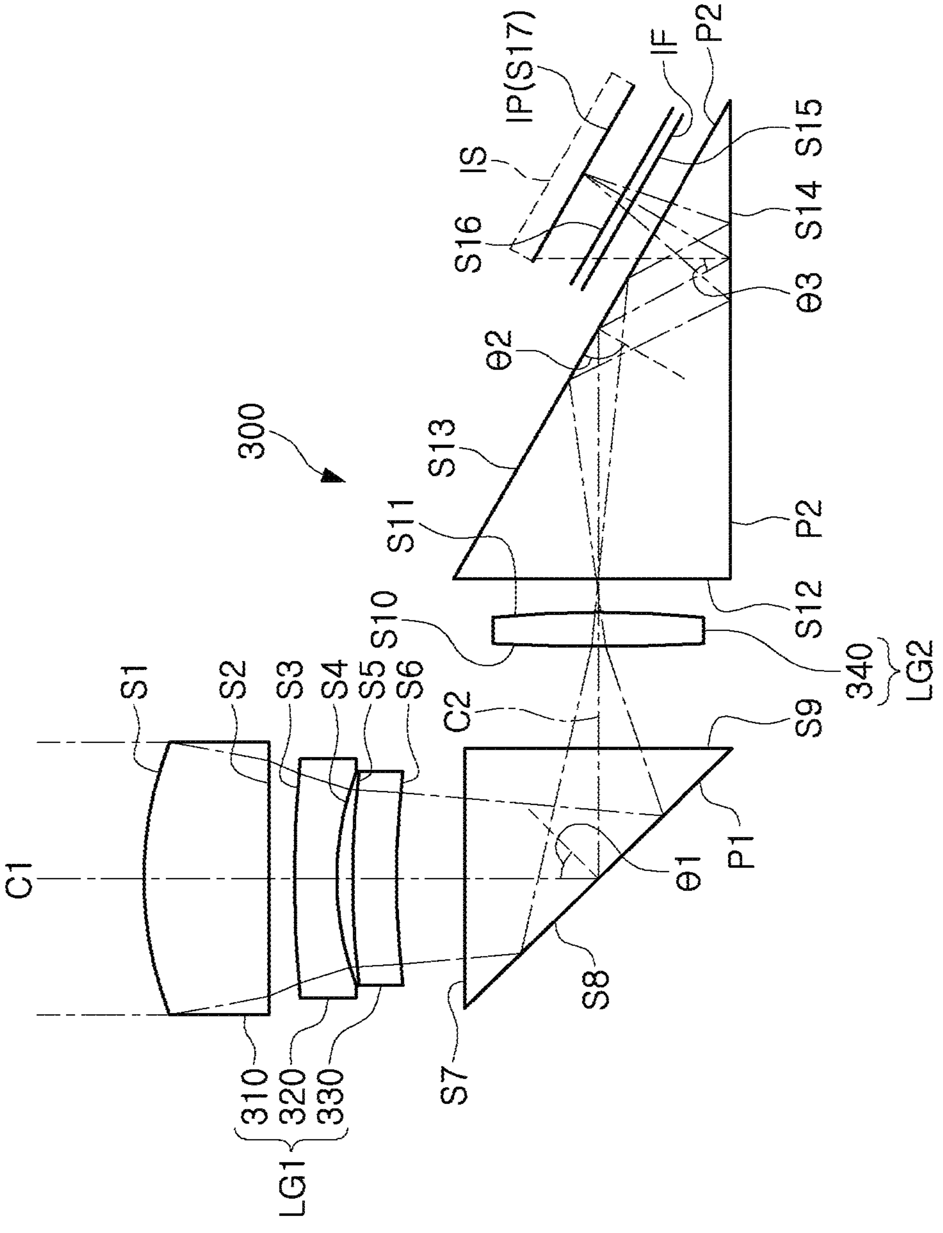
FIG. 7 is a block diagram of an imaging lens system according to a third example embodiment.

Next, the imaging lens system according to the third example embodiment is described with reference to FIG. 7.

An imaging lens system 300 according to the present example embodiment may include a first lens group LG1, the first prism P1, a second lens group LG2 and the second prism P2. However, the components of the imaging lens system 300 are not limited to the above-described members. For example, the imaging lens system 300 may further include the filter IF and the imaging plane IP. The first lens group LG1, the first prism P1, the second lens group LG2 and the second prism P2 may be sequentially arranged from the object side. For example, the first lens group LG1 may be disposed on the object side of the first prism P1, and the second lens group LG2 may be disposed between the first prism P1 and the second prism P2.

Next, the above-described components are described in order.

The first lens group LG1 may include a plurality of lenses. For example, the first lens group LG1 may include a first lens 310, a second lens 320 and a third lens 330 sequentially arranged from the object side. The first lens 310 to the third lens 330 may be arranged at a predetermined interval. For example, an image-side surface of the first lens 310 may not be in contact with an object-side surface of the second lens 320, and an image-side surface of the second lens 320 may not be in contact with an object-side surface of the third lens 330. However, the first lens 310 to the third lens 330 may not necessarily be arranged so as not to be in contact with one another. For example, the image-side surface of the first lens 310 may be in contact with the object-side surface of the second lens 320, or the image-side surface of the second lens 320 may be in contact with the object-side surface of the third lens 330.

The second lens group LG2 may include one or more lenses. For example, the second lens group LG2 may include a fourth lens 340. However, the lens included in the second lens group LG2 is not limited to the fourth lens 340. For example, the second lens group LG2 may further include a lens or may include the above-described filter IF.

Next, characteristics of the first lens 310 to the fourth lens 340 included in the first lens group LG1 and the second lens group LG2 are described.

The first lens 310 may have refractive power. For example, the first lens 310 may have the positive refractive power. The first lens 310 may have the convex object-side surface and the convex image-side surface. The first lens 310 may have the spherical surface. For example, both surfaces of the first lens 310 may be spherical. The second lens 320 may have refractive power. For example, the second lens 320 may have negative refractive power. The second lens 320 may have the convex object-side surface and the concave image-side surface. The second lens 320 may have the aspherical surface. For example, both surfaces of the second lens 320 may be aspherical. The third lens 330 may have refractive power. For example, the third lens 330 may have the positive refractive power. The third lens 330 may have the convex object-side surface and the concave image-side surface. The third lens 330 may have the aspherical surface. For example, both surfaces of the third lens 330 may be aspherical. The fourth lens 340 may have refractive power. For example, the fourth lens 340 may have the positive refractive power. The fourth lens 340 may have the convex object-side surface and the convex image-side surface. The fourth lens 340 may have the spherical surface. For example, both surfaces of the fourth lens 340 may be spherical.

Next, the first prism P1 and the second prism P2 which are the optical path folding members are described. For reference, the prism described below is one type of the optical path folding member described in the claims, and may be changed to another member.

The first prism P1 and the second prism P2 may be disposed so that light incident through the first lens 310 to the fourth lens 340 is imaged on the imaging plane IP. For example, the first prism P1 and the second prism P2 may be sequentially disposed along the optical path between the third lens 330 and the imaging plane IP.

The first prism P1 may have the triangular cross section. For example, the cross section of the first prism cut in the optical path direction may have the right-angled triangle shape. The incident surface S7 of the first prism P1 and the projection surface S9 of the first prism P1 may form the substantially right angle. For example, the incident surface S7 of the first prism P1 and the projection surface S9 of the first prism P1 may respectively be formed in a portion other than the hypotenuse in the cross-sectional shape of the right-angled triangle.

The first prism P1 may include the reflective surface. For example, the first prism P1 may include one first reflective surface S8. The first reflective surface S8 may enable total reflection. For example, the first angle of incidence θ1 of the first reflective surface S8 may be greater than the critical angle of the first reflective surface S8. In more detail, the first angle of incidence θ1 may be 45 degrees which is greater than 41.2 degrees, that is, the critical angle of the first reflective surface S8. The first prism P1 configured as described above may reflect light incident from the third lens 330 to the second prism P2 as it is.

The second prism P2 may have the triangular cross section. For example, the cross section of the second prism cut in the optical path direction may have the right-angled triangle shape. The second prism P2 may include the plurality of reflective surfaces. For example, the second prism P2 may include a second reflective surface S13 and a third reflective surface S14.

The second prism P2 may enable total reflection and specular reflection. For example, the second reflective surface S13 of the second prism P2 may enable total reflection, and the third reflective surface S14 of the second prism P2 may enable specular reflection or mirror reflection. As a specific example, a second angle of incidence θ2 of the second reflective surface S13 may be greater than a critical angle of the second reflective surface S13, and a third angle of incidence θ3 of the third reflective surface S14 may be less than a critical angle of the third reflective surface S14.

The second reflective surface S13 and the third reflective surface S14 may form an acute angle. For example, an angle θp2 between the second reflective surface S13 and the third reflective surface S14 may be 16 to 32 degrees. The second reflective surface S13 and the third reflective surface S14 may have a predetermined angle between an incident surface S12 of the second prism P2. For example, an angle between the second reflective surface S13 and the incident surface S12 of the second prism P2 may be 58 to 74 degrees, and an angle between the third reflective surface S14 and the incident surface S12 of the second prism P2 may be approximately 90 degrees.

The second prism P2 may enable the plurality of internal reflections. For example, light incident through the incident surface S12 of the second prism P2 may be reflected by the second reflective surface S13 and then re-reflected by the third reflective surface S14.

One surface of the second prism P2 may enable both the reflection and projection. For example, the second reflective surface S13 of the second prism P2 may transmit light incident from the third reflective surface S14 while reflecting light incident through the incident surface S12 to the third reflective surface S14.

The first to third reflective surfaces S8, S13 and S14 of the first prism P1 and the second prism P2 may have a predetermined size relationship therebetween. For example, the first angle of incidence θ1 may be less than the second angle of incidence θ2, and the third angle of incidence θ3 may be less than the first angle of incidence θ1.

The first prism P1 and the second prism P2 which are configured as described above may make the imaging lens system 300 small and integrated by folding the optical path connected from the object side to the imaging plane. For example, the first prism P1 may fold the optical path extended along the first optical axis C1 in the direction of the second optical axis C2 intersecting the first optical axis C1, thereby reducing a length of the imaging lens system 300 in the direction of the first optical axis C1. In another example, the second prism P2 may fold the optical path extended along the second optical axis C2 twice or more through total reflection and the mirror reflection, thereby reducing a length of the imaging lens system 300 in the direction of the second optical axis C2.

The filter IF and the imaging plane IP may be disposed on one side of the second prism P2. For example, the filter IF and the imaging plane IP may be disposed to face the hypotenuse having the largest length in the cross-sectional shape of the second prism P2. As a specific example, the filter IF and the imaging plane IP may be disposed to face the second reflective surface S13 of the second prism P2.

The filter IF may block light of the specific wavelength. For example, the filter IF according to the present example embodiment may block the infrared light. However, a type of light blocked by the filter IF is not limited to the infrared light. For example, the filter IF may block the ultraviolet or visible light.

The imaging plane IP may be positioned at a point where light reflected by the third reflective surface S14 converges or forms an image, and may be formed by the image sensor IS or the like. For example, the imaging plane IP may be formed on or inside the image sensor IS.

Figure 8:
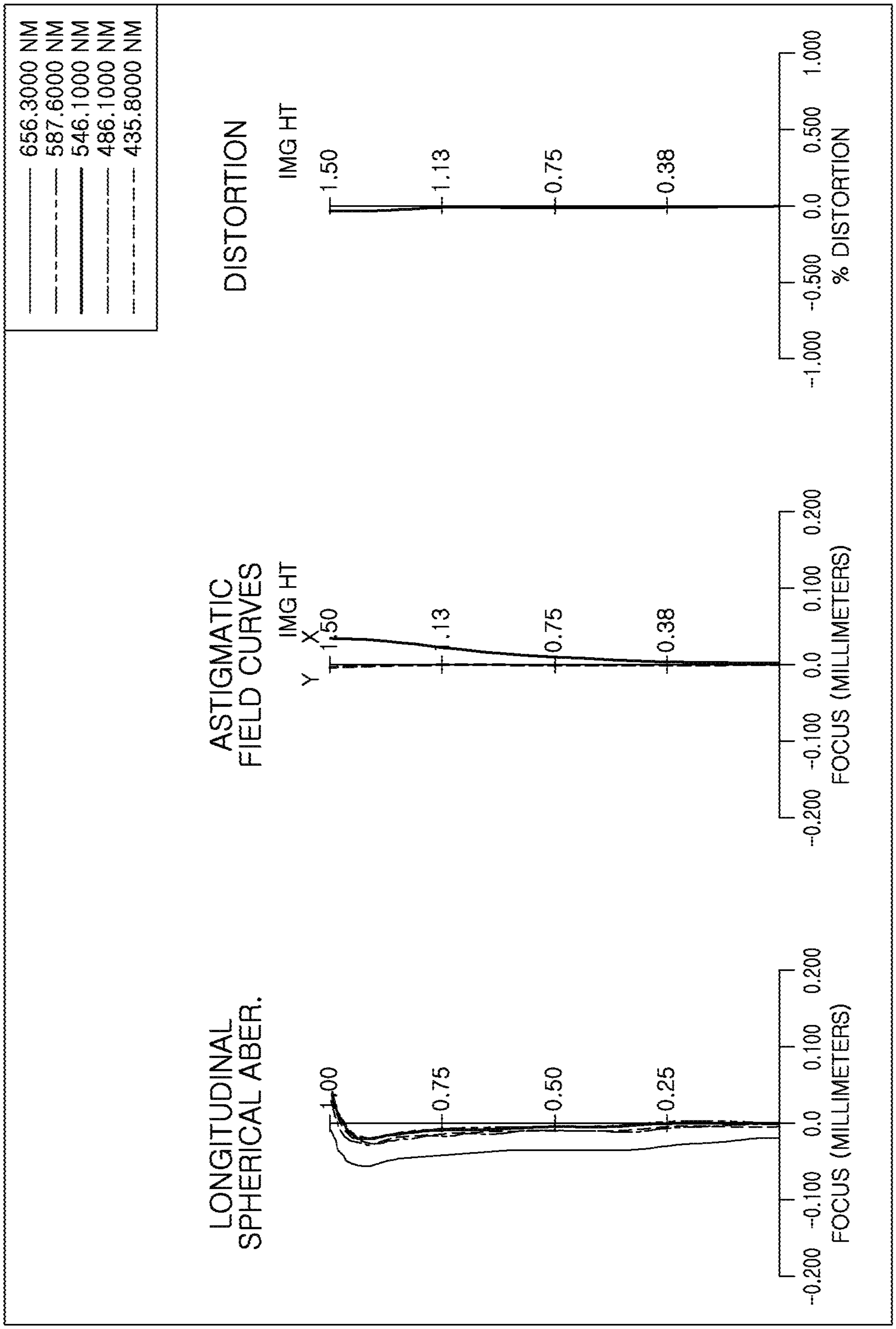
FIG. 8 is an aberration curve of the imaging lens system illustrated in FIG. 7.

The imaging lens system 300 configured as above may show aberration characteristics illustrated in FIG. 8. Tables 5 and 6 show the lens characteristics and aspheric values, respectively, of the imaging lens system according to the present example embodiment.

TABLE 5

| Surface no. | Component | Radius of curvature | Thickness/ Distance | Refractive index | Abbe number |
|---|---|---|---|---|---|
| S1 | First lens | 4.9949 | 1.948 | 1.537 | 55.7 |
| S2 | | −97.7127 | 0.391 | | |
| S3 | Second lens | 19.5409 | 0.631 | 1.646 | 23.5 |
| S4 | | 3.8887 | 0.250 | | |
| S5 | Third lens | 8.8202 | 0.719 | 1.669 | 20.3 |
| S6 | | 26.6496 | 1.000 | | |
| S7 | First prism | Infinity | 2.000 | 1.519 | 64.2 |
| S8 | | Infinity | 2.000 | 1.519 | 64.2 |
| S9 | | Infinity | 1.500 | | |
| S10 | Fourth lens | 30.0000 | 0.500 | 1.537 | 55.7 |
| S11 | | −30.0000 | 0.500 | | |
| S12 | Second prism | Infinity | 3.500 | 1.519 | 64.2 |
| S13 | | Infinity | 2.500 | 1.519 | 64.2 |
| S14 | | Infinity | 1.250 | 1.519 | 64.2 |
| S13 | | Infinity | 0.500 | | |
| S15 | Filter | Infinity | 0.210 | 1.519 | 64.2 |
| S16 | | Infinity | 0.500 | | |
| S17 | Imaging plane | Infinity | 0.187 | | |
| S18 | | Infinity | 0.000 | | |

TABLE 6

| Surface no. | S1 | S2 | S3 | S4 | S5 | S6 | S10 | S11 |
|---|---|---|---|---|---|---|---|---|
| K | 0 | 0 | 4.25E+01 | 2.17E−01 | −2.54E+00 | 7.89E+01 | 0 | 0 |
| A | 0 | 0 | 1.16E−02 | 1.74E−02 | 7.08E−03 | −5.72E−03 | 0 | 0 |
| B | 0 | 0 | 1.27E−03 | −1.72E−04 | −3.46E−04 | −1.85E−03 | 0 | 0 |
| C | 0 | 0 | 6.76E−05 | 2.88E−04 | 5.74E−06 | 5.10E−04 | 0 | 0 |
| D | 0 | 0 | 3.68E−04 | 3.51E−04 | 1.05E−04 | −3.12E−04 | 0 | 0 |
| E | 0 | 0 | 0 | 0 | 0 | 0 | 0 | 0 |
| F | 0 | 0 | 0 | 0 | 0 | 0 | 0 | 0 |
| G | 0 | 0 | 0 | 0 | 0 | 0 | 0 | 0 |
| H | 0 | 0 | 0 | 0 | 0 | 0 | 0 | 0 |
| J | 0 | 0 | 0 | 0 | 0 | 0 | 0 | 0 |

Figure 9:
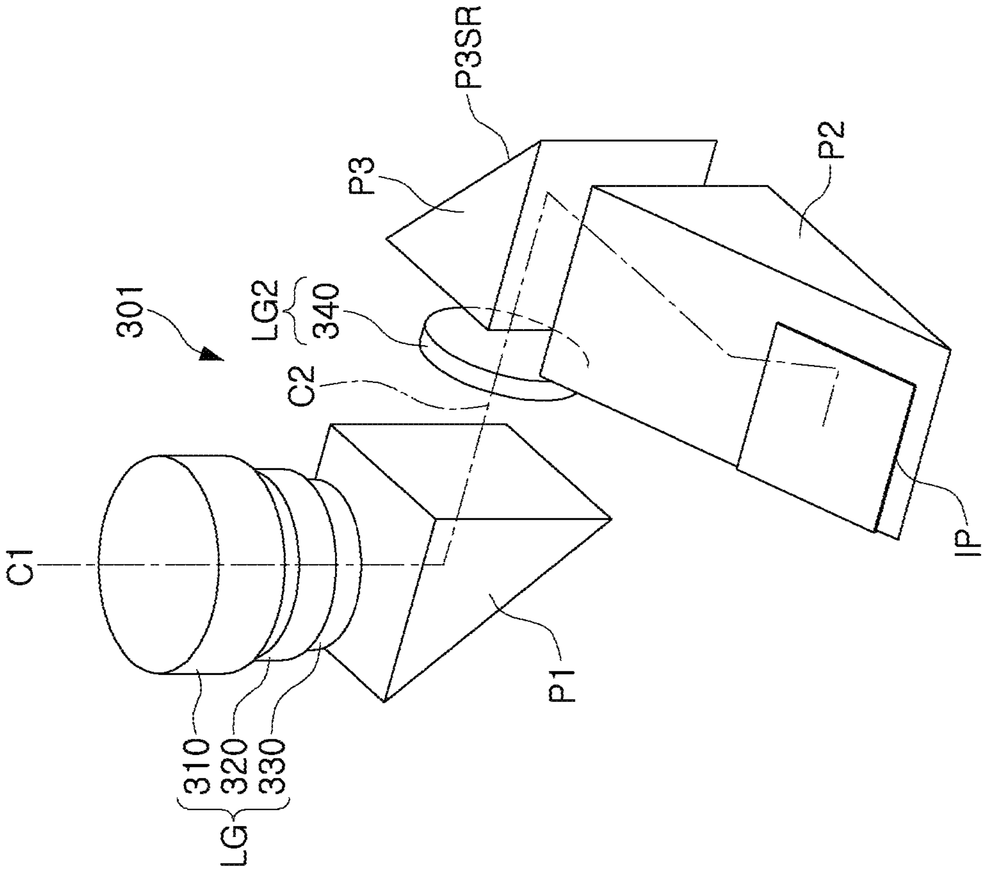
FIG. 9 is a configuration diagram of a modified example of the imaging lens system illustrated in FIG. 7.
Figure 10:
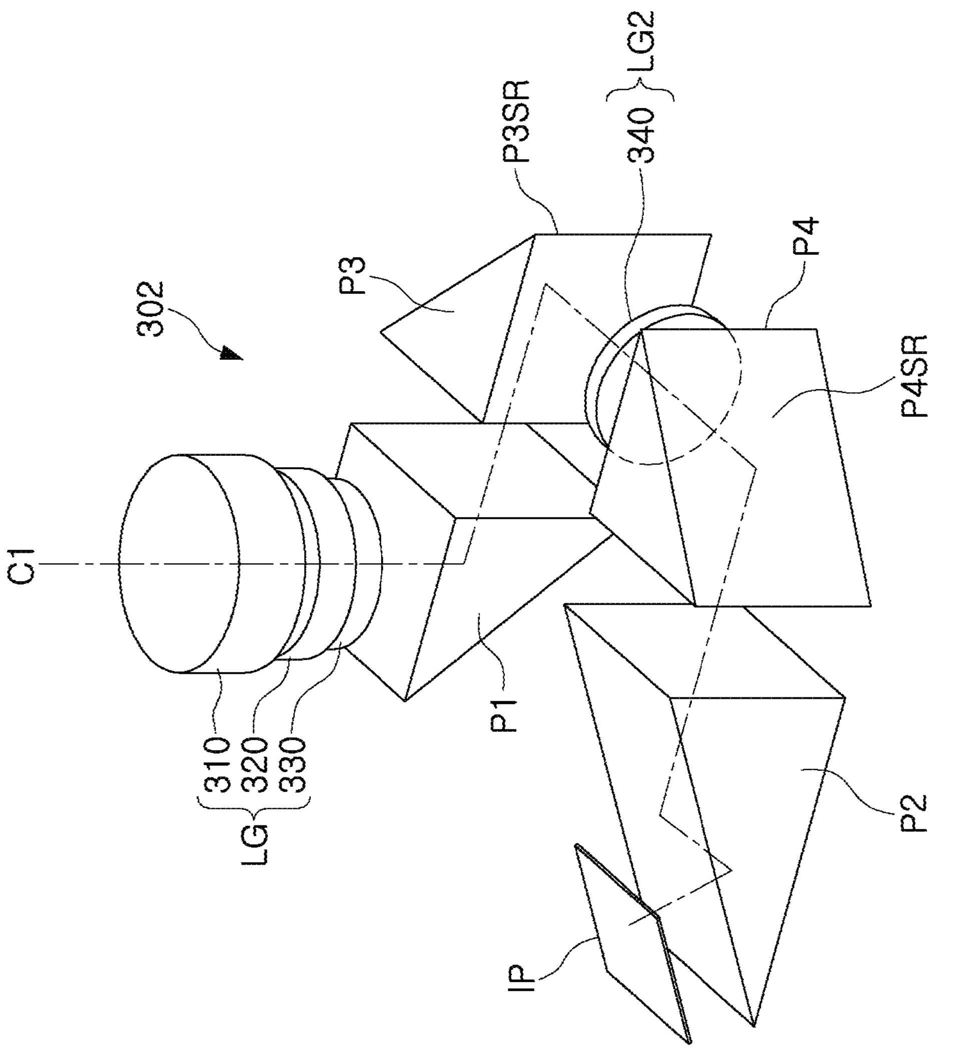
FIG. 10 is a configuration diagram of another modified example of the imaging lens system illustrated in FIG. 7.

Next, modified examples of the imaging lens system according to the third example embodiment are described with reference to FIGS. 9 and 10. For reference, in the following description, the same components as those of the above-described example embodiments are denoted by the same reference numerals as those of the above-described example embodiments and detailed descriptions of these components are omitted.

First, an imaging lens system 301 according to a first modified example is described with reference to FIG. 9.

The imaging lens system 301 according to the first modified example may further include a third prism P3. For example, the imaging lens system 301 may further include the third prism P3 disposed between the second lens group LG2 and the second prism P2.

The third prism P3 may include the reflective surface. For example, the third prism P3 may include one reflective surface P3SR. The reflective surface P3SR of the third prism P3 may enable total reflection. For example, an angle of incidence of the reflective surface P3SR may be greater than a critical angle of the reflective surface P3SR. The third prism P3 may have a shape substantially the same as or similar to that of the first prism P1. However, the first prism P1 and the third prism P3 may not necessarily have the same or similar shape.

Figure 4:
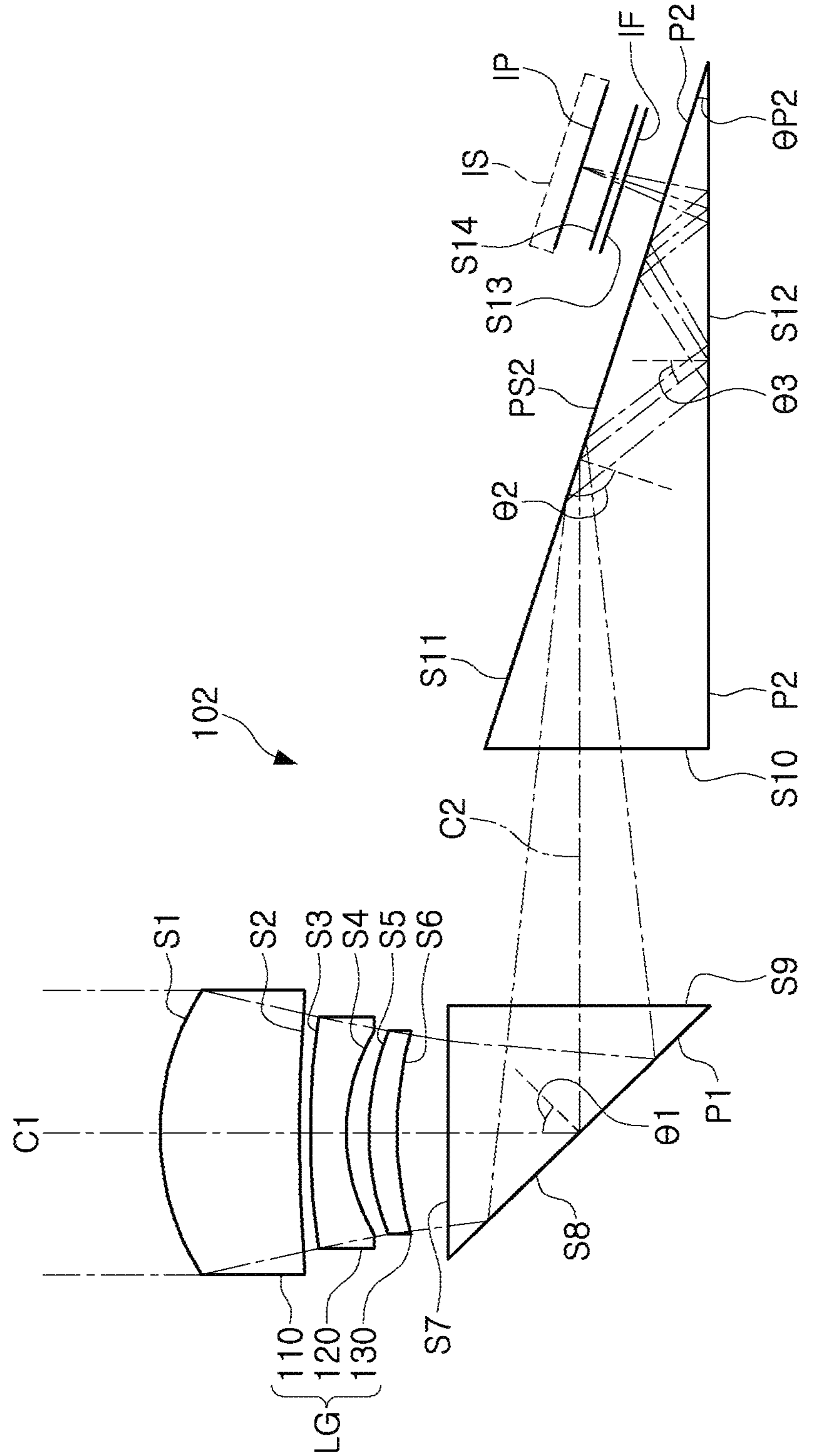
FIG. 4 is a configuration diagram of another modified example of the imaging lens system illustrated in FIG. 1.

The imaging lens system 301 configured as above may have a back focal length (BFL, i.e., distance from an image-side surface of the fourth lens 340 to the imaging plane IP) easily extended without deforming the second prism P2 to have the shape illustrated in FIG. 4.

Next, an imaging lens system 302 according to a second modified example is described with reference to FIG. 10.

The imaging lens system 302 according to the second modified example may further include the third prism P3 and a fourth prism P4. For example, the imaging lens system 302 may further include the third prism P3 disposed between the first prism P1 and the second lens group LG2 and the fourth prism P4 disposed between the second lens group LG2 and the second prism P2.

The third prism P3 may include the reflective surface. For example, the third prism P3 may include one reflective surface P3SR. The reflective surface P3SR of the third prism P3 may enable total reflection. For example, the angle of incidence of the reflective surface P3SR may be greater than the critical angle of the reflective surface P3SR. The third prism P3 may have a shape substantially the same as or similar to that of the first prism P1. However, the first prism P1 and the third prism P3 may not necessarily have the same or similar shape.

The fourth prism P4 may include the reflective surface. For example, the fourth prism P4 may include one reflective surface P4SR. The reflective surface P4SR of the fourth prism P4 may enable total reflection. For example, an angle of incidence of the reflective surface P4SR may be greater than a critical angle of the reflective surface P4SR. The fourth prism P4 may have a shape substantially the same as or similar to that of the first or third prism P1 or P3. However, the fourth prism P4 may not necessarily have the same or similar shape as that of the first or third prism P1 or P3.

The imaging lens system 302 configured as above may have the integrated arrangement of the plurality of lens groups LG1 and LG2 and the imaging plane IP through the plurality of prisms P1, P2, P3 and P4 in a limited space, and thus be easily mounted in the electronic device having a narrow installation space, such as the portable terminal.

Figure 11:
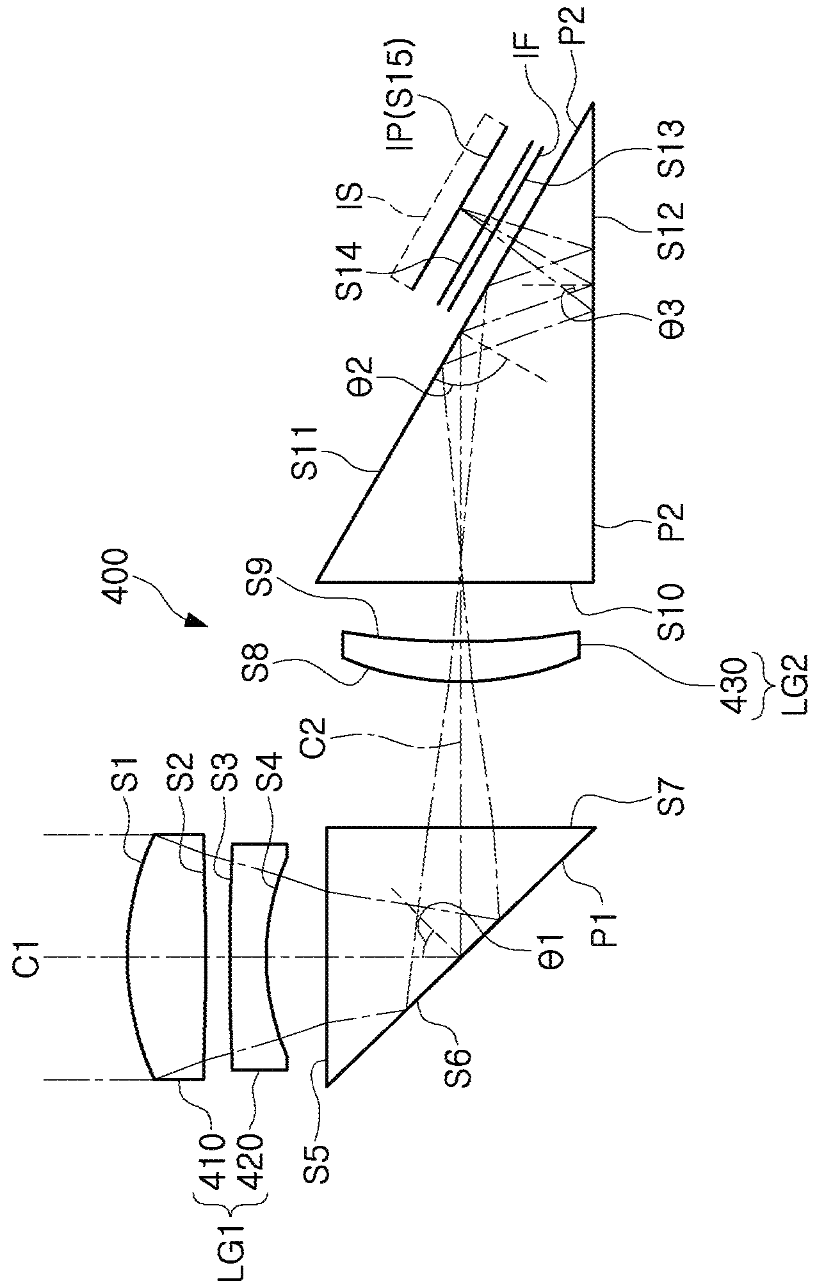
FIG. 11 is a block diagram of an imaging lens system according to a fourth example embodiment.

Next, the imaging lens system according to the fourth example embodiment is described with reference to FIG. 11.

An imaging lens system 400 according to the present example embodiment may include a first lens group LG1, the first prism P1, a second lens group LG2 and the second prism P2. However, the components of the imaging lens system 400 are not limited to the above-described members. For example, the imaging lens system 400 may further include the filter IF and the imaging plane IP. The first lens group LG1, the first prism P1, the second lens group LG2 and the second prism P2 may be sequentially arranged from the object side. For example, the first lens group LG1 may be disposed on the object side of the first prism P1, and the second lens group LG2 may be disposed between the first prism P1 and the second prism P2.

Next, the above-described components are described in order.

The first lens group LG1 may include a plurality of lenses. For example, the first lens group LG1 may include a first lens 410 and a second lens 420 sequentially disposed from the object side. The first lens 410 and the second lens 420 may be disposed at a predetermined interval. For example, an image-side surface of the first lens 410 may not be in contact with an object-side surface of the second lens 420. However, the first lens 410 and the second lens 420 may not necessarily be disposed so as not to be in contact with each other. For example, the image-side surface of the first lens 410 may be in contact with the object-side surface of the second lens 420.

The second lens group LG2 may include one or more lenses. For example, the second lens group LG2 may include a third lens 430. However, the lens included in the second lens group LG2 is not limited to the third lens 430.

Next, characteristics of the first lens 410 to the third lens 430 included in the first lens group LG1 and the second lens group LG2 are described.

The first lens 410 may have refractive power. For example, the first lens 410 may have the positive refractive power. The first lens 410 may have the convex object-side surface and the convex image-side surface. The first lens 410 may have the spherical surface. For example, both surfaces of the first lens 410 may be spherical. The second lens 420 may have refractive power. For example, the second lens 420 may have negative refractive power. The second lens 420 may have the convex object-side surface and the concave image-side surface. The second lens 420 may have the aspherical surface. For example, both surfaces of the second lens 420 may be aspherical. The third lens 430 may have refractive power. For example, the third lens 430 may have the positive refractive power. The third lens 430 may have the convex object-side surface and the concave image-side surface. The third lens 430 may have the spherical surface and the aspherical surface. For example, an object-side surface of the third lens 430 may be spherical, and an image-side surface thereof may be aspherical.

Next, the first prism P1 and the second prism P2 which are the optical path folding members are described. For reference, the prism described below is one type of the optical path folding member described in the claims, and may be changed to another member.

The first prism P1 and the second prism P2 may be disposed so that light incident through the first lens 410 to the third lens 430 is imaged on the imaging plane IP. For example, the first prism P1 and the second prism P2 may be sequentially disposed along the optical path between the second lens 420 and the imaging plane IP.

The first prism P1 may have the triangular cross section. For example, the cross section of the first prism cut in the optical path direction may have the right-angled triangle shape. An incident surface S5 of the first prism P1 and a projection surface S7 of the first prism P1 may form a substantially right angle. For example, the incident surface S5 of the first prism P1 and the projection surface S7 of the first prism P1 may respectively be formed in a portion other than the hypotenuse in the cross-sectional shape of the right-angled triangle.

The first prism P1 may include the reflective surface. For example, the first prism P1 may include one first reflective surface S6. The first reflective surface S6 may enable total reflection. For example, a first angle of incidence θ1 of the first reflective surface S6 may be greater than a critical angle of the first reflective surface S6. In more detail, the first angle of incidence θ1 may be 45 degrees which is greater than 41.2 degrees, that is, the critical angle of the first reflective surface S6. The first prism P1 configured as described above may reflect light incident from the second lens 420 to the third lens 430 and the second prism P2.

The second prism P2 may have the triangular cross section. For example, the cross section of the second prism cut in the optical path direction may have the right-angled triangle shape. The second prism P2 may include the plurality of reflective surfaces. For example, the second prism P2 may include the second reflective surface S11 and the third reflective surface S12.

The second prism P2 may enable total reflection and specular reflection. For example, the second reflective surface S11 of the second prism P2 may enable total reflection, and the third reflective surface S12 of the second prism P2 may enable specular reflection or mirror reflection. As a specific example, the second angle of incidence θ2 of the second reflective surface S11 may be greater than the critical angle of the second reflective surface S11, and the third angle of incidence θ3 of the third reflective surface S12 may be less than the critical angle of the third reflective surface S12.

The second reflective surface S11 and the third reflective surface S12 may form the acute angle. For example, the angle θp2 between the second reflective surface S11 and the third reflective surface S12 may be 16 to 32 degrees. The second reflective surface S11 and the third reflective surface S12 may have the predetermined angle between the incident surface S10 of the second prism P2. For example, the angle between the second reflective surface S11 and the incident surface S10 of the second prism P2 may be 58 to 74 degrees, and the angle between the third reflective surface S12 and the incident surface S10 of the second prism P2 may be approximately 90 degrees.

The second prism P2 may enable the plurality of internal reflections. For example, light incident through the incident surface S10 of the second prism P2 may be reflected by the second reflective surface S11 and then re-reflected by the third reflective surface S12.

One surface of the second prism P2 may enable both the reflection and projection. For example, the second reflective surface S11 of the second prism P2 may transmit light incident from the third reflective surface S12 while reflecting light incident through the incident surface S10 to the third reflective surface S12.

The first to third reflective surfaces S6, S11 and S12 of the first prism P1 and the second prism P2 may have a predetermined size relationship therebetween. For example, the first angle of incidence θ1 may be less than the second angle of incidence θ2, and the third angle of incidence θ3 may be less than the first angle of incidence θ1.

The first prism P1 and the second prism P2 which are configured as described above may make the imaging lens system 400 small and integrated by folding the optical path connected from the object side to the imaging plane. For example, the first prism P1 may fold the optical path extended along the first optical axis C1 in the direction of the second optical axis C2 intersecting the first optical axis C1, thereby reducing a length of the imaging lens system 400 in the direction of the first optical axis C1. In another example, the second prism P2 may fold the optical path extended along the second optical axis C2 twice or more through total reflection and the mirror reflection, thereby reducing a length of the imaging lens system 400 in the direction of the second optical axis C2.

The filter IF and the imaging plane IP may be disposed on one side of the second prism P2. For example, the filter IF and the imaging plane IP may be disposed to face the hypotenuse having the largest length in the cross-sectional shape of the second prism P2. As a specific example, the filter IF and the imaging plane IP may be disposed to face the second reflective surface S11 of the second prism P2.

The filter IF may block light of the specific wavelength. For example, the filter IF according to the present example embodiment may block the infrared light. However, a type of light blocked by the filter IF is not limited to the infrared light. For example, the filter IF may block the ultraviolet or visible light.

The imaging plane IP may be positioned at the point where light reflected by the third reflective surface S12 converges or forms an image, and may be formed by the image sensor IS or the like. For example, the imaging plane IP may be formed on or inside the image sensor IS.

Figure 12:
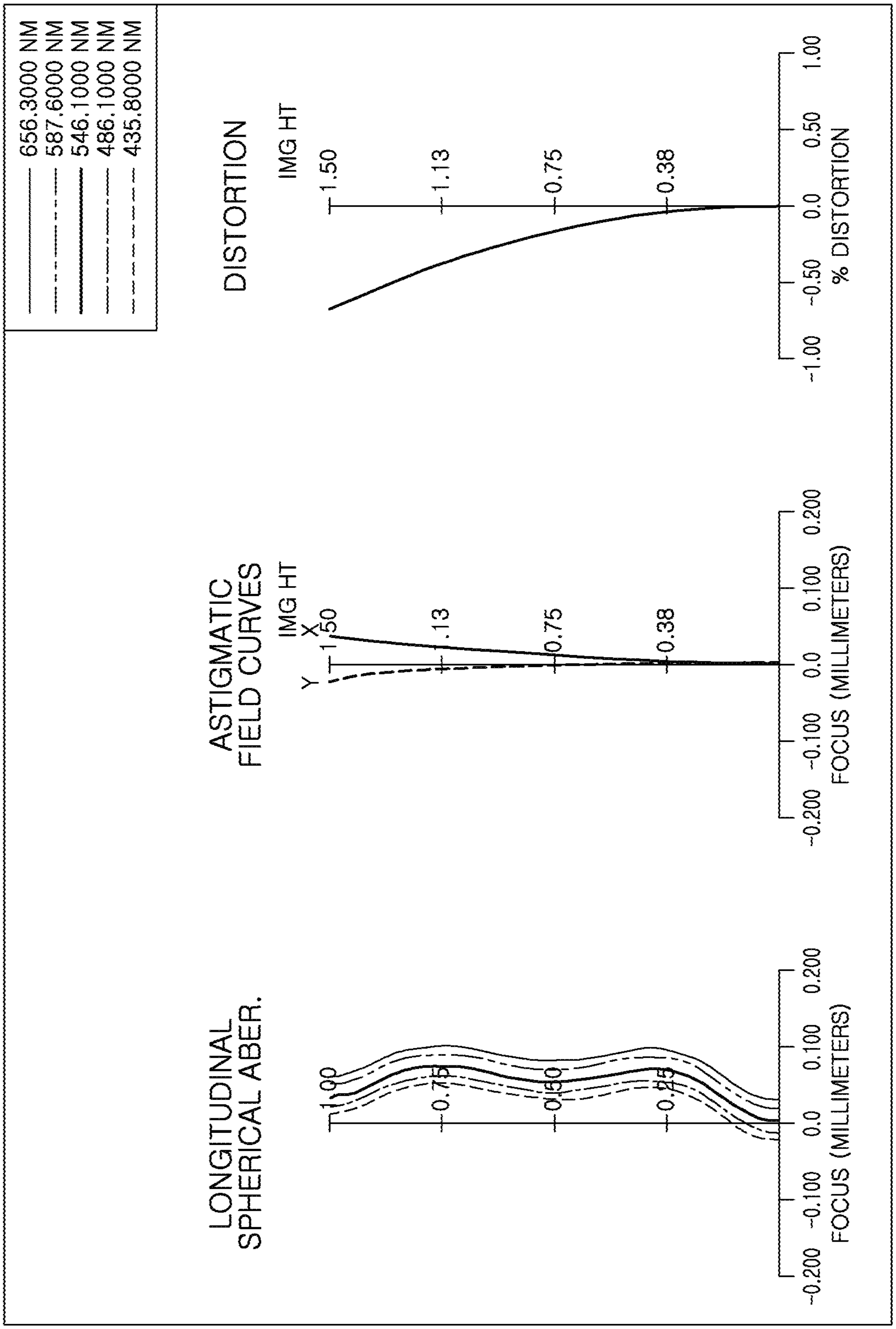
FIG. 12 is an aberration curve of the imaging lens system illustrated in FIG. 11.

The imaging lens system 400 configured as above may show aberration characteristics illustrated in FIG. 12. Tables 7 and 8 show the lens characteristics and aspheric values, respectively, of the imaging lens system according to the present example embodiment.

TABLE 7

| Surface no. | Component | Radius of curvature | Thickness/ Distance | Refractive index | Abbe number |
|---|---|---|---|---|---|
| S1 | First lens | 4.6702 | 1.300 | 1.537 | 55.7 |
| S2 | | −42.9801 | 0.391 | | |
| S3 | Second lens | 18.0341 | 0.631 | 1.646 | 23.5 |
| S4 | | 4.3778 | 1.000 | | |
| S5 | First prism | Infinity | 2.200 | 1.519 | 64.2 |
| S6 | | Infinity | 2.200 | 1.519 | 64.2 |
| S7 | | Infinity | 2.200 | | |
| S8 | Third lens | 5.5645 | 0.700 | 1.537 | 55.7 |
| S9 | | 14.1348 | 1.000 | | |
| S10 | Second prism | Infinity | 3.500 | 1.519 | 64.2 |
| S11 | | Infinity | 2.500 | 1.519 | 64.2 |
| S12 | | Infinity | 1.250 | 1.519 | 64.2 |
| S11 | | Infinity | 0.500 | | |
| S13 | Filter | Infinity | 0.210 | 1.519 | 64.2 |
| S14 | | Infinity | 0.479 | | |
| S15 | Imaging plane | Infinity | 0.000 | | |

TABLE 8

| Surface no. | S1 | S2 | S3 | S4 | S8 | S9 |
|---|---|---|---|---|---|---|
| K | 0 | 0 | 3.81E+01 | 4.58E−01 | 0 | −2.0E+00 |
| A | 0 | 0 | 1.55E−02 | 9.45E−03 | 0 | 6.0E−04 |
| B | 0 | 0 | 7.11E−04 | 1.42E−03 | 0 | −2.8E−05 |
| C | 0 | 0 | 5.93E−04 | 2.08E−04 | 0 | 5.4E−05 |
| D | 0 | 0 | 1.58E−04 | 3.24E−04 | 0 | −3.4E−06 |
| E | 0 | 0 | 1.12E−04 | 1.02E−04 | 0 | −2.7E−06 |

TABLE 8-continued

| Surface no. | S1 | S2 | S3 | S4 | S8 | S9 |
|---|---|---|---|---|---|---|
| F | 0 | 0 | −1.92E−05 | −2.22E−05 | 0 | −1.6E−07 |
| G | 0 | 0 | 1.03E−04 | 1.54E−04 | 0 | 1.3E−07 |
| H | 0 | 0 | 0 | 0 | 0 | 3.0E−08 |
| J | 0 | 0 | 0 | 0 | 0 | −8.4E−09 |

Figure 13:
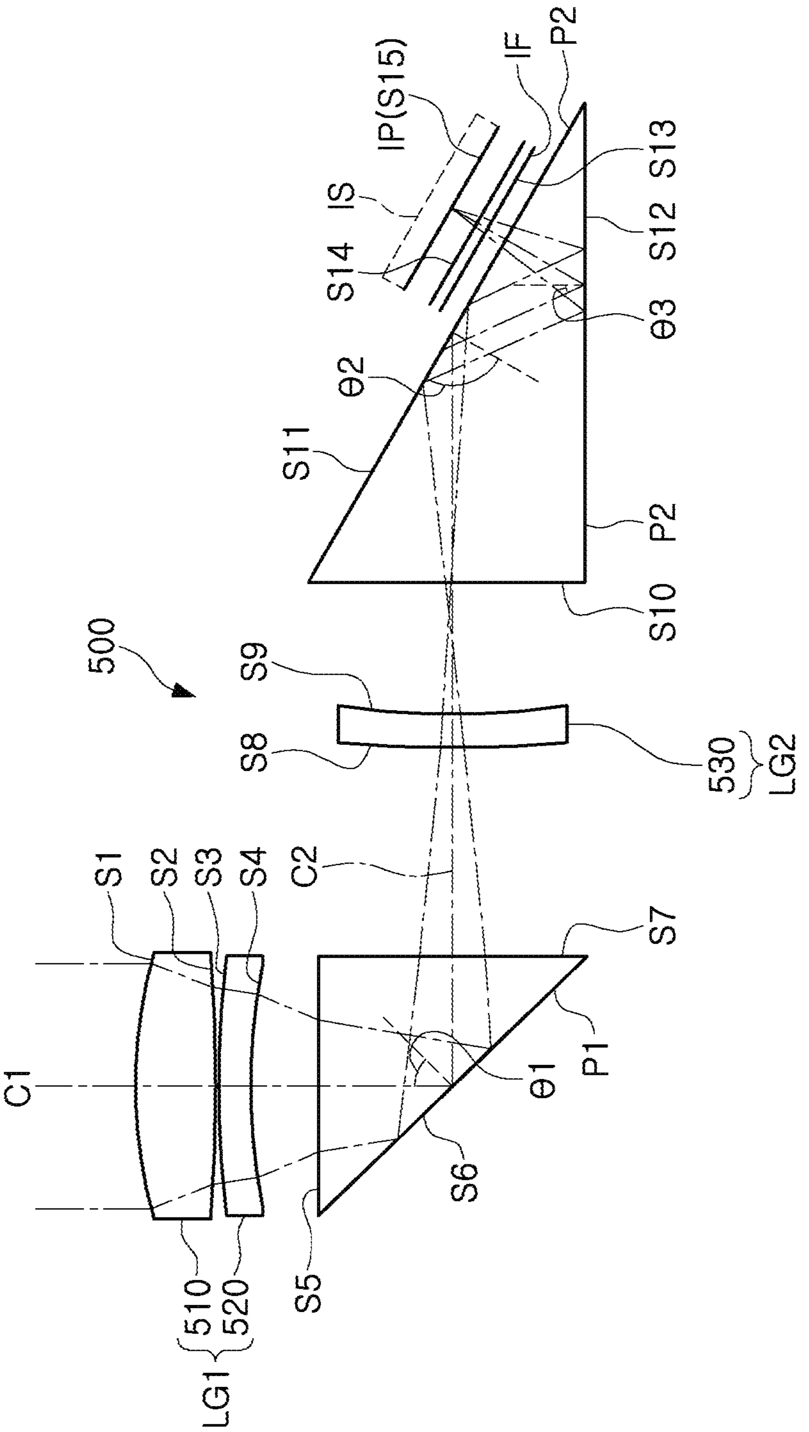
FIG. 13 is a block diagram of an imaging lens system according to a fifth example embodiment.

Next, the imaging lens system according to the fifth example embodiment is described with reference to FIG. 13.

An imaging lens system 500 according to the present example embodiment may include a first lens group LG1, the first prism P1, a second lens group LG2 and the second prism P2. However, the components of the imaging lens system 500 are not limited to the above-described members. For example, the imaging lens system 500 may further include the filter IF and the imaging plane IP. The first lens group LG1, the first prism P1, the second lens group LG2 and the second prism P2 may be sequentially arranged from the object side. For example, the first lens group LG1 may be disposed on the object side of the first prism P1, and the second lens group LG2 may be disposed between the first prism P1 and the second prism P2.

Next, the above-described components are described in order.

The first lens group LG1 may include a plurality of lenses. For example, the first lens group LG1 may include a first lens 510 and a second lens 520 sequentially disposed from the object side. The first lens 510 and the second lens 520 may be disposed at a predetermined interval. For example, an image-side surface of the first lens 510 may not be in contact with an object-side surface of the second lens 520. However, the first lens 510 and the second lens 520 may not necessarily be disposed so as not to be in contact with each other. For example, the image-side surface of the first lens 510 may be in contact with the object-side surface of the second lens 520.

The second lens group LG2 may include one or more lenses. For example, the second lens group LG2 may include a third lens 530. However, the lens included in the second lens group LG2 is not limited to the third lens 530.

Next, characteristics of the first lens 510 to the third lens 530 included in the first lens group LG1 and the second lens group LG2 are described.

The first lens 510 may have refractive power. For example, the first lens 510 may have the positive refractive power. The first lens 510 may have the convex object-side surface and the convex image-side surface. The first lens 510 may have the spherical surface. For example, both surfaces of the first lens 510 may be spherical. The second lens 520 may have refractive power. For example, the second lens 520 may have negative refractive power. The second lens 520 may have the convex object-side surface and the concave image-side surface. The second lens 520 may have the aspherical surface. For example, both surfaces of the second lens 520 may be aspherical. The third lens 530 may have refractive power. For example, the third lens 530 may have negative refractive power. The third lens 530 may have the convex object-side surface and the concave image-side surface. The third lens 530 may have the spherical surface and the aspherical surface. For example, an object-side surface of the third lens 530 may be spherical, and an image-side surface thereof may be aspherical.

Next, the first prism P1 and the second prism P2 which are the optical path folding members are described. For reference, the prism described below is one type of the optical path folding member described in the claims, and may be changed to another member.

The first prism P1 and the second prism P2 may be disposed so that light incident through the first lens 510 to the third lens 530 is imaged on the imaging plane IP. For example, the first prism P1 and the second prism P2 may be sequentially disposed along the optical path between the second lens 520 and the imaging plane IP.

The first prism P1 may have the triangular cross section. For example, the cross section of the first prism cut in the optical path direction may have the right-angled triangle shape. The incident surface S5 of the first prism P1 and the projection surface S7 of the first prism P1 may form the substantially right angle. For example, the incident surface S5 of the first prism P1 and the projection surface S7 of the first prism P1 may respectively be formed in the portion other than the hypotenuse in the cross-sectional shape of the right-angled triangle.

The first prism P1 may include the reflective surface. For example, the first prism P1 may include one first reflective surface S6. The first reflective surface S6 may enable total reflection. For example, the first angle of incidence θ1 of the first reflective surface S6 may be greater than the critical angle of the first reflective surface S6. In more detail, the first angle of incidence θ1 may be 45 degrees which is greater than 41.2 degrees, that is, the critical angle of the first reflective surface S6. The first prism P1 configured as described above may reflect light incident from the second lens 520 to the third lens 530 and the second prism P2.

The second prism P2 may have the triangular cross section. For example, the cross section of the second prism cut in the optical path direction may have the right-angled triangle shape. The second prism P2 may include the plurality of reflective surfaces. For example, the second prism P2 may include the second reflective surface S11 and the third reflective surface S12.

The second prism P2 may enable total reflection and specular reflection. For example, the second reflective surface S11 of the second prism P2 may enable total reflection, and the third reflective surface S12 of the second prism P2 may enable specular reflection or mirror reflection. As a specific example, the second angle of incidence θ2 of the second reflective surface S11 may be greater than the critical angle of the second reflective surface S11, and the third angle of incidence θ3 of the third reflective surface S12 may be less than the critical angle of the third reflective surface S12.

The second reflective surface S11 and the third reflective surface S12 may form the acute angle. For example, the angle θp2 between the second reflective surface S11 and the third reflective surface S12 may be 16 to 32 degrees. The second reflective surface S11 and the third reflective surface S12 may have the predetermined angle between the incident surface S10 of the second prism P2. For example, the angle between the second reflective surface S11 and the incident surface S10 of the second prism P2 may be 58 to 74 degrees, and the angle between the third reflective surface S12 and the incident surface S10 of the second prism P2 may be approximately 90 degrees.

The second prism P2 may enable the plurality of internal reflections. For example, light incident through the incident surface S10 of the second prism P2 may be reflected by the second reflective surface S11 and then re-reflected by the third reflective surface S12.

One surface of the second prism P2 may enable both the reflection and projection. For example, the second reflective surface S11 of the second prism P2 may transmit light incident from the third reflective surface S12 while reflecting light incident through the incident surface S10 to the third reflective surface S12.

The first to third reflective surfaces S6, S11 and S12 of the first prism P1 and the second prism P2 may have the predetermined size relationship therebetween. For example, the first angle of incidence θ1 may be less than the second angle of incidence θ2, and the third angle of incidence θ3 may be less than the first angle of incidence θ1.

The first prism P1 and the second prism P2 which are configured as described above may make the imaging lens system 500 small and integrate by folding the optical path connected from the object side to the imaging plane. For example, the first prism P1 may fold the optical path extended along the first optical axis C1 in the direction of the second optical axis C2 intersecting the first optical axis C1, thereby reducing a length of the imaging lens system 500 in the direction of the first optical axis C1. In another example, the second prism P2 may fold the optical path extended along the second optical axis C2 twice or more through total reflection and the mirror reflection, thereby reducing a length of the imaging lens system 500 in the direction of the second optical axis C2.

The filter IF and the imaging plane IP may be disposed on one side of the second prism P2. For example, the filter IF and the imaging plane IP may be disposed to face the hypotenuse having the largest length in the cross-sectional shape of the second prism P2. As a specific example, the filter IF and the imaging plane IP may be disposed to face the second reflective surface S11 of the second prism P2.

The filter IF may block light of the specific wavelength. For example, the filter IF according to the present example embodiment may block the infrared light. However, a type of light blocked by the filter IF is not limited to the infrared light. For example, the filter IF may block the ultraviolet or visible light.

The imaging plane IP may be positioned at the point where light reflected by the third reflective surface S12 converges or forms an image, and may be formed by the image sensor IS or the like. For example, the imaging plane IP may be formed on or inside the image sensor IS.

Figure 14:
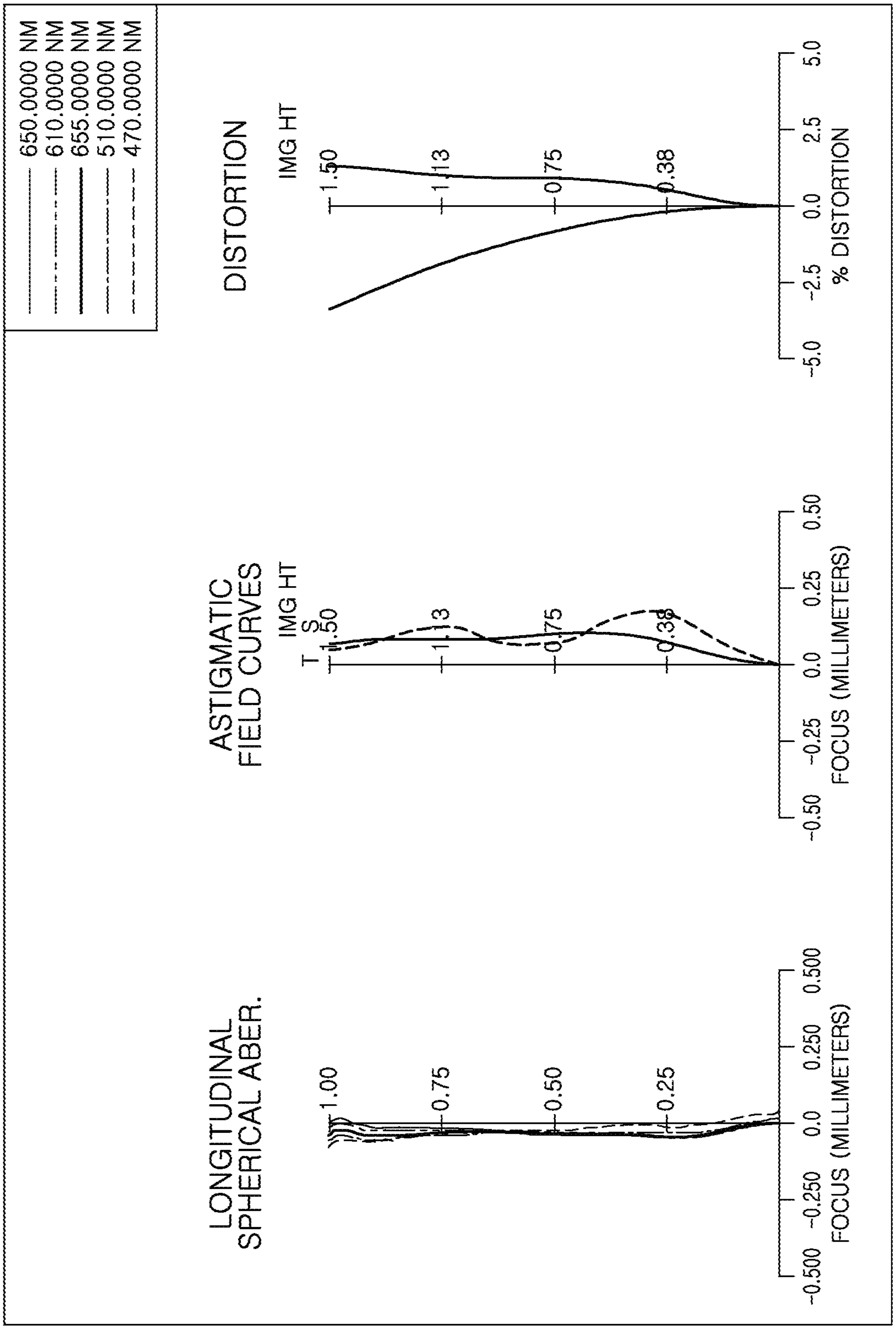
FIG. 14 is an aberration curve of the imaging lens system illustrated in FIG. 13.

The imaging lens system 500 configured as above may show aberration characteristics illustrated in FIG. 14. Tables 9 and 10 show the lens characteristics and aspheric values, respectively, of the imaging lens system according to the present example embodiment.

TABLE 9

| Surface no. | Component | Radius of curvature | Thickness/ Distance | Refractive index | Abbe number |
|---|---|---|---|---|---|
| S1 | First lens | 5.5237 | 1.000 | 1.537 | 55.7 |
| S2 | | −25.1115 | 0.050 | | |
| S3 | Second lens | 13.5896 | 0.400 | 1.646 | 23.5 |
| S4 | | 7.0152 | 0.800 | | |
| S5 | First prism | Infinity | 1.600 | 1.519 | 64.2 |
| S6 | | Infinity | 1.600 | 1.519 | 64.2 |
| S7 | | Infinity | 2.500 | | |
| S8 | Third lens | 16.0727 | 0.400 | 1.537 | 55.7 |
| S9 | | 10.7448 | 1.500 | | |
| S10 | Second prism | Infinity | 3.000 | 1.519 | 64.2 |
| S11 | | Infinity | 2.000 | 1.519 | 64.2 |
| S12 | | Infinity | 1.000 | 1.519 | 64.2 |
| S11 | | Infinity | 0.500 | | |
| S13 | Filter | Infinity | 0.210 | 1.519 | 64.2 |
| S14 | | Infinity | 0.236 | | |
| S15 | Imaging plane | Infinity | 0.066 | | |

TABLE 10

| Surface no. | S1 | S2 | S3 | S4 | S8 | S9 |
|---|---|---|---|---|---|---|
| K | 0 | 0 | 3.26E+01 | 1.15E+00 | 0 | 2.0E+01 |
| A | 0 | 0 | 1.37E−02 | 5.12E−03 | 0 | 2.1E−03 |
| B | 0 | 0 | −8.93E−04 | 1.42E−03 | 0 | 3.0E−04 |
| C | 0 | 0 | 7.69E−04 | 5.53E−04 | 0 | 1.0E−04 |
| D | 0 | 0 | 7.84E−04 | 7.76E−04 | 0 | 5.2E−05 |
| E | 0 | 0 | −1.57E−04 | 6.40E−05 | 0 | 3.8E−05 |
| F | 0 | 0 | −7.69E−06 | 4.97E−05 | 0 | 2.2E−05 |
| G | 0 | 0 | −8.42E−06 | −2.76E−05 | 0 | 1.6E−06 |
| H | 0 | 0 | 0 | 0 | 0 | 0 |
| J | 0 | 0 | 0 | 0 | 0 | 0 |

Figure 15:
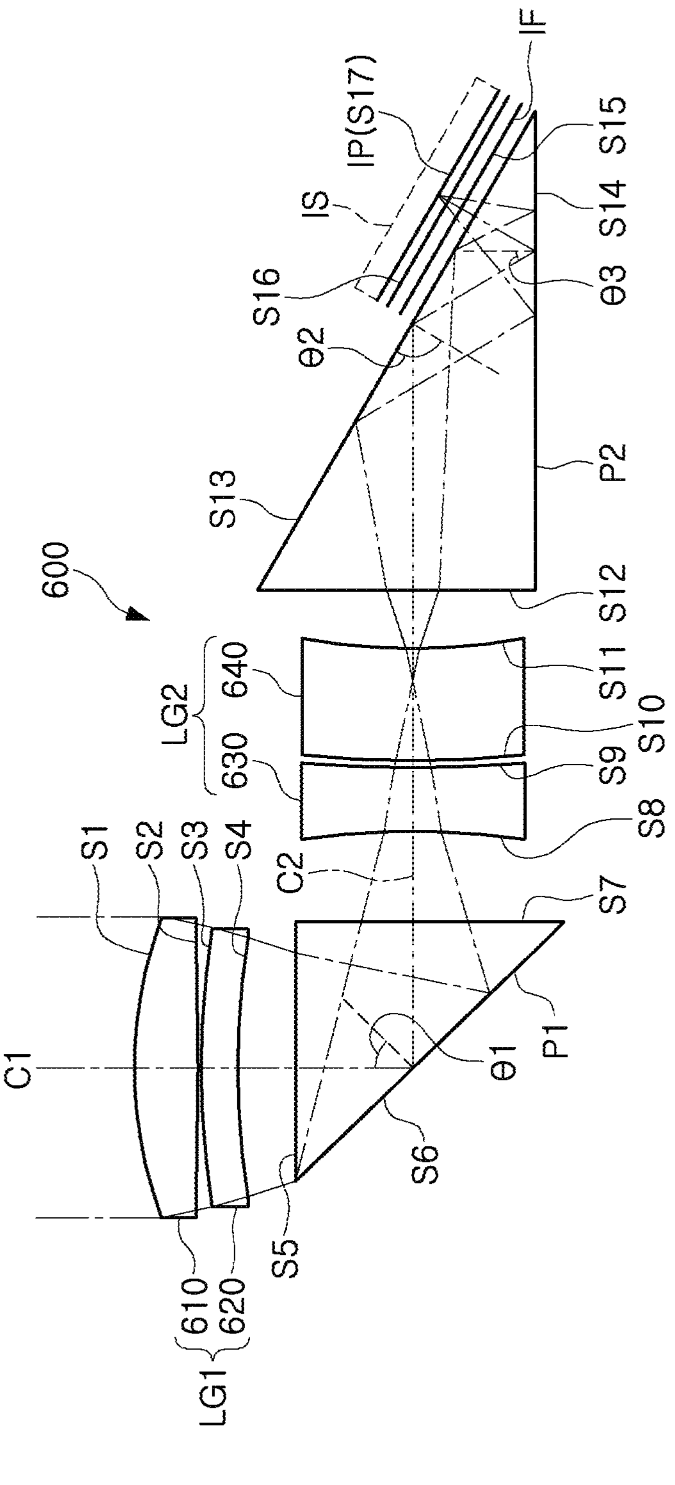
FIG. 15 is a block diagram of an imaging lens system according to a sixth example embodiment.

Next, the imaging lens system according to the sixth example embodiment is described with reference to FIG. 15.

An imaging lens system 600 according to the present example embodiment may include a first lens group LG1, the first prism P1, a second lens group LG2 and the second prism P2. However, the components of the imaging lens system 600 are not limited to the above-described members. For example, the imaging lens system 600 may further include the filter IF and the imaging plane IP. The first lens group LG1, the first prism P1, the second lens group LG2 and the second prism P2 may be sequentially arranged from the object side. For example, the first lens group LG1 may be disposed on the object side of the first prism P1, and the second lens group LG2 may be disposed between the first prism P1 and the second prism P2.

Next, the above-described components are described in order.

The first lens group LG1 may include a plurality of lenses. For example, the first lens group LG1 may include a first lens 610 and a second lens 620 sequentially disposed from the object side. The first lens 610 and the second lens 620 may be disposed at a predetermined interval. For example, an image-side surface of the first lens 610 may not be in contact with an object-side surface of the second lens 620. However, the first lens 610 and the second lens 620 may not necessarily be disposed so as not to be in contact with each other. For example, the image-side surface of the first lens 610 may be in contact with the object-side surface of the second lens 620.

The second lens group LG2 may include a plurality of lenses. For example, the second lens group LG2 may include a third lens 630 and a fourth lens 640 sequentially disposed from the object side. The third lens 630 and the fourth lens 640 may be disposed at a predetermined interval. For example, an image-side surface of the third lens 630 may not be in contact with an object-side surface of the fourth lens 640. However, the third lens 630 and the fourth lens 640 may not necessarily be disposed so as not to be in contact with each other. For example, the image-side surface of the third lens 630 may be in contact with the object-side surface of the fourth lens 640.

Next, characteristics of the first lens 610 to the fourth lens 640 included in the first lens group LG1 and the second lens group LG2 are described.

The first lens 610 may have refractive power. For example, the first lens 610 may have the positive refractive power. The first lens 610 may have the convex object-side surface and the convex image-side surface. The first lens 610 may have the spherical surface. For example, both surfaces of the first lens 610 may be spherical. The second lens 620 may have refractive power. For example, the second lens 620 may have negative refractive power. The second lens 620 may have the convex object-side surface and the concave image-side surface. The second lens 620 may have the aspherical surface. For example, both surfaces of the second lens 620 may be aspherical. The third lens 630 may have refractive power. For example, the third lens 630 may have negative refractive power. The third lens 630 may have the concave object-side surface and the concave image-side surface. The third lens 630 may have the spherical surface. For example, both surfaces of the third lens 630 may be spherical. The fourth lens 640 may have refractive power. For example, the fourth lens 640 may have negative refractive power. The fourth lens 640 may have the convex object-side surface and the concave image-side surface. The fourth lens 640 may have the aspherical surface. For example, both surfaces of the fourth lens 640 may be aspherical.

Next, the first prism P1 and the second prism P2 which are the optical path folding members are described. For reference, the prism described below is one type of the optical path folding member described in the claims, and may be changed to another member.

The first prism P1 and the second prism P2 may be disposed so that light incident through the first lens 610 to the fourth lens 640 is imaged on the imaging plane IP. For example, the first prism P1 and the second prism P2 may be sequentially disposed along the optical path between the second lens 620 and the imaging plane IP.

The first prism P1 may have the triangular cross section. For example, the cross section of the first prism cut in the optical path direction may have the right-angled triangle shape. The incident surface S5 of the first prism P1 and the projection surface S7 of the first prism P1 may form the substantially right angle. For example, the incident surface S5 of the first prism P1 and the projection surface S7 of the first prism P1 may respectively be formed in a portion other than the hypotenuse in the cross-sectional shape of the right-angled triangle.

The first prism P1 may include the reflective surface. For example, the first prism P1 may include one first reflective surface S6. The first reflective surface S6 may enable total reflection. For example, the first angle of incidence θ1 of the first reflective surface S6 may be greater than the critical angle of the first reflective surface S6. In more detail, the first angle of incidence θ1 may be 45 degrees which is greater than 41.2 degrees, that is, the critical angle of the first reflective surface S6. The first prism P1 configured as described above may reflect light incident from the second lens 620 to the second prism P2.

The second prism P2 may have the triangular cross section. For example, the cross section of the second prism cut in the optical path direction may have the right-angled triangle shape. The second prism P2 may include the plurality of reflective surfaces. For example, the second prism P2 may include the second reflective surface S13 and the third reflective surface S14.

The second prism P2 may enable total reflection and specular reflection. For example, the second reflective surface S13 of the second prism P2 may enable total reflection, and the third reflective surface S14 of the second prism P2 may enable specular reflection or mirror reflection. As a specific example, the second angle of incidence θ2 of the second reflective surface S13 may be greater than the critical angle of the second reflective surface S13, and the third angle of incidence θ3 of the third reflective surface S14 may be less than the critical angle of the third reflective surface S14.

The second reflective surface S13 and the third reflective surface S14 may form the acute angle. For example, the angle θp2 between the second reflective surface S13 and the third reflective surface S14 may be 16 to 32 degrees. The second reflective surface S13 and the third reflective surface S14 may have the predetermined angle between the incident surface S12 of the second prism P2. For example, the angle between the second reflective surface S13 and the incident surface S12 of the second prism P2 may be 58 to 74 degrees, and the angle between the third reflective surface S14 and the incident surface S12 of the second prism P2 may be approximately 90 degrees.

The second prism P2 may enable the plurality of internal reflections. For example, light incident through the incident surface S12 of the second prism P2 may be reflected by the second reflective surface S13 and then re-reflected by the third reflective surface S14.

One surface of the second prism P2 may enable both the reflection and projection. For example, the second reflective surface S13 of the second prism P2 may transmit light incident from the third reflective surface S14 while reflecting light incident through the incident surface S12 to the third reflective surface S14.

The first to third reflective surfaces S6, S13 and S14 of the first prism P1 and the second prism P2 may have the predetermined size relationship therebetween. For example, the first angle of incidence θ1 may be less than the second angle of incidence θ2, and the third angle of incidence θ3 may be less than the first angle of incidence θ1.

The first prism P1 and the second prism P2 which are configured as described above may make the imaging lens system 600 small and integrated by folding the optical path connected from the object side to the imaging plane. For example, the first prism P1 may fold the optical path extended along the first optical axis C1 in the direction of the second optical axis C2 intersecting the first optical axis C1, thereby reducing a length of the imaging lens system 600 in the direction of the first optical axis C1. In another example, the second prism P2 may fold the optical path extended along the second optical axis C2 twice or more through total reflection and the mirror reflection, thereby reducing a length of the imaging lens system 600 in the direction of the second optical axis C2.

The filter IF and the imaging plane IP may be disposed on one side of the second prism P2. For example, the filter IF and the imaging plane IP may be disposed to face the hypotenuse having the largest length in the cross-sectional shape of the second prism P2. As a specific example, the filter IF and the imaging plane IP may be disposed to face the second reflective surface S13 of the second prism P2.

The filter IF may block light of the specific wavelength. For example, the filter IF according to the present example embodiment may block the infrared light. However, a type of light blocked by the filter IF is not limited to the infrared light. For example, the filter IF may block the ultraviolet or visible light.

The imaging plane IP may be positioned at the point where light reflected by the third reflective surface S14 converges or forms an image, and may be formed by the image sensor IS or the like. For example, the imaging plane IP may be formed on or inside the image sensor IS.

Figure 16:
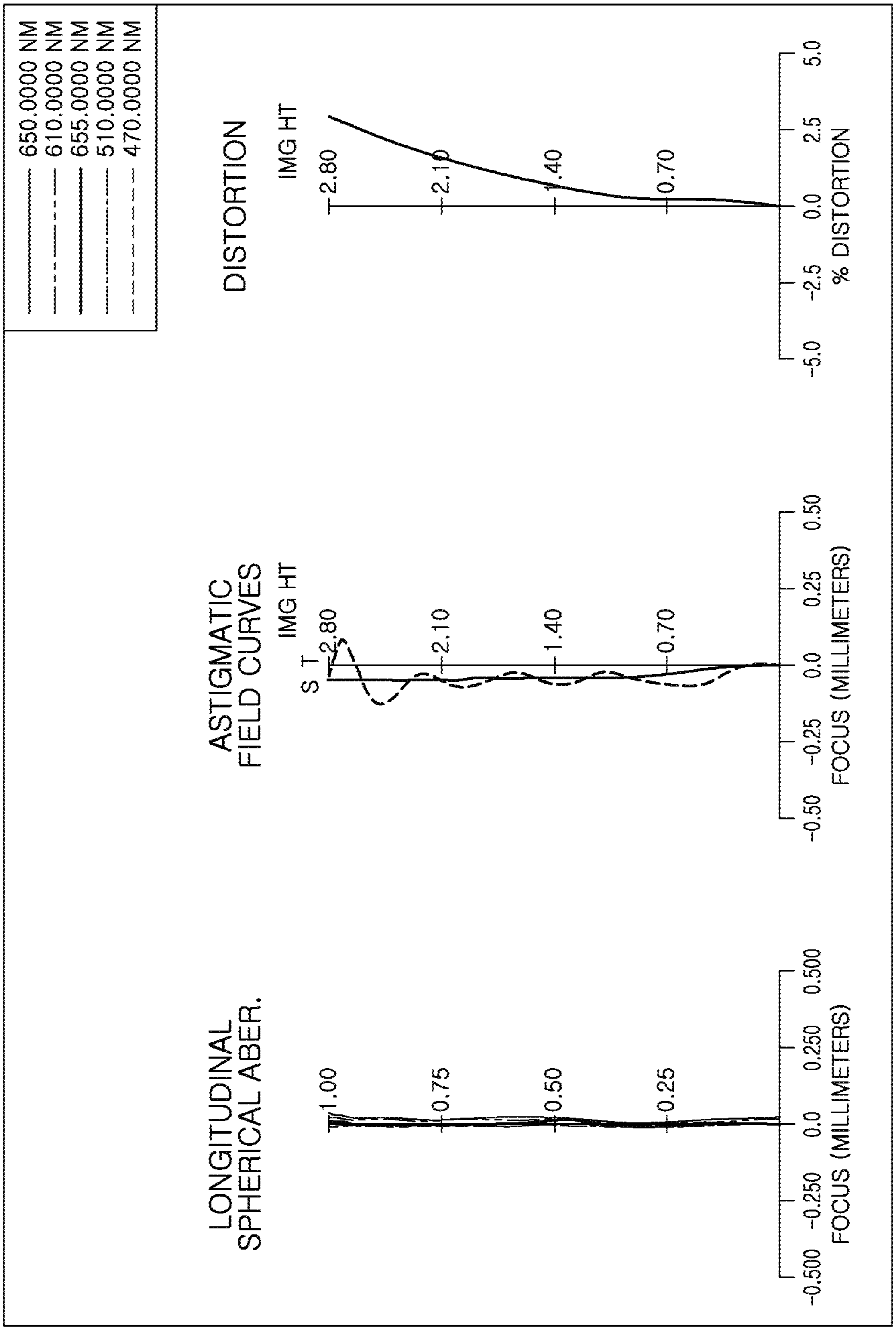
FIG. 16 is an aberration curve of the imaging lens system illustrated in FIG. 15.

The imaging lens system 600 configured as above may show aberration characteristics illustrated in FIG. 16. Tables 11 and 12 show the lens characteristics and aspheric values, respectively, of the imaging lens system according to the present example embodiment.

TABLE 11

| Surface no. | Component | Radius of curvature | Thickness/ Distance | Refractive index | Abbe number |
|---|---|---|---|---|---|
| S1 | First lens | 5.2750 | 0.900 | 1.537 | 55.7 |
| S2 | | −35.6289 | 0.050 | | |
| S3 | Second lens | 13.2037 | 0.500 | 1.669 | 20.3 |
| S4 | | 9.4598 | 0.800 | | |
| S5 | First prism | Infinity | 1.600 | 1.723 | 29.5 |
| S6 | | Infinity | 1.600 | 1.723 | 29.5 |
| S7 | | Infinity | 1.500 | | |
| S8 | Third lens | −17.5264 | 0.882 | 1.669 | 20.3 |
| S9 | | 17.8445 | 0.080 | | |
| S10 | Fourth lens | 11.2450 | 1.505 | 1.537 | 55.7 |
| S11 | | 8.3425 | 0.800 | | |
| S12 | Second prism | Infinity | 3.500 | 1.723 | 29.5 |
| S13 | | Infinity | 2.000 | 1.723 | 29.5 |
| S14 | | Infinity | 1.000 | 1.723 | 29.5 |
| S13 | | Infinity | 0.200 | | |
| S15 | Filter | Infinity | 0.210 | 1.519 | 64.2 |
| S16 | | Infinity | 0.148 | | |
| S17 | Imaging plane | Infinity | 0.000 | | |

TABLE 12

| Surface no. | S1 | S2 | S3 | S4 | S8 | S9 | S10 | S11 |
|---|---|---|---|---|---|---|---|---|
| K | 0 | 0 | 2.8E+01 | 2.5E−01 | −3.7E+01 | −7.4E+01 | −4.2E+01 | −5.9E−01 |
| A | 0 | 0 | 1.9E−02 | 1.0E−02 | 0 | 0 | −3.9E−03 | −3.0E−03 |
| B | 0 | 0 | −1.7E−03 | −6.3E−04 | 0 | 0 | −4.7E−04 | −6.0E−04 |
| C | 0 | 0 | 4.2E−04 | 5.6E−04 | 0 | 0 | −1.5E−04 | −2.9E−04 |
| D | 0 | 0 | 7.8E−04 | −9.9E−05 | 0 | 0 | −5.5E−05 | −2.2E−04 |
| E | 0 | 0 | −3.1E−04 | 8.9E−04 | 0 | 0 | −3.5E−05 | −1.9E−04 |
| F | 0 | 0 | −1.2E−04 | −9.3E−04 | 0 | 0 | −7.5E−06 | −1.4E−04 |
| G | 0 | 0 | −9.5E−06 | −2.4E−04 | 0 | 0 | −4.7E−06 | −6.5E−05 |
| H | 0 | 0 | 0 | 0 | 0 | 0 | 0 | 0 |
| J | 0 | 0 | 0 | 0 | 0 | 0 | 0 | 0 |

Figure 17:
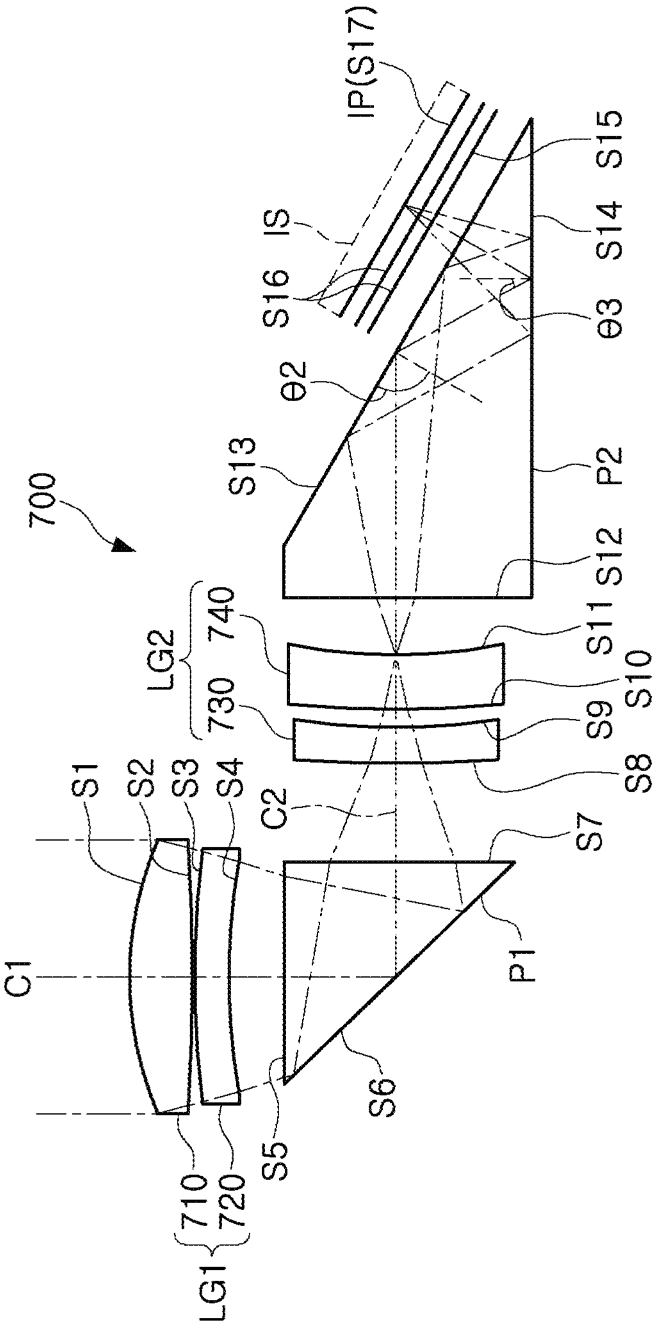
FIG. 17 is a block diagram of an imaging lens system according to a seventh example embodiment.

Next, the imaging lens system according to the seventh example embodiment is described with reference to FIG. 17.

An imaging lens system 700 according to the present example embodiment may include a first lens group LG1, the first prism P1, a second lens group LG2 and the second prism P2. However, the components of the imaging lens system 700 are not limited to the above-described members. For example, the imaging lens system 700 may further include the filter IF and the imaging plane IP. The first lens group LG1, the first prism P1, the second lens group LG2 and the second prism P2 may be sequentially arranged from the object side. For example, the first lens group LG1 may be disposed on the object side of the first prism P1, and the second lens group LG2 may be disposed between the first prism P1 and the second prism P2.

Next, the above-described components are described in order.

The first lens group LG1 may include a plurality of lenses. For example, the first lens group LG1 may include a first lens 710 and a second lens 720 sequentially disposed from the object side. The first lens 710 and the second lens 720 may be disposed at a predetermined interval. For example, an image-side surface of the first lens 710 may not be in contact with an object-side surface of the second lens 720. However, the first lens 710 and the second lens 720 may not necessarily be disposed so as not to be in contact with each other. For example, the image-side surface of the first lens 710 may be in contact with the object-side surface of the second lens 720.

The second lens group LG2 may include a plurality of lenses. For example, the second lens group LG2 may include a third lens 730 and a fourth lens 740 sequentially disposed from the object side. The third lens 730 and the fourth lens 740 may be disposed at a predetermined interval. For example, an image-side surface of the third lens 730 may not be in contact with an object-side surface of the fourth lens 740. However, the third lens 730 and the fourth lens 740 may not necessarily be disposed so as not to be in contact with each other. For example, the image-side surface of the third lens 730 may be in contact with the object-side surface of the fourth lens 740.

Next, characteristics of the first lens 710 to the fourth lens 740 included in the first lens group LG1 and the second lens group LG2 are described.

The first lens 710 may have refractive power. For example, the first lens 710 may have the positive refractive power. The first lens 710 may have the convex object-side surface and the convex image-side surface. The first lens 710 may have the aspherical surface. For example, both surfaces of the first lens 710 may be aspherical. The second lens 720 may have refractive power. For example, the second lens 720 may have negative refractive power. The second lens 720 may have the convex object-side surface and the concave image-side surface. The second lens 720 may have the aspherical surface. For example, both surfaces of the second lens 720 may be aspherical. The third lens 730 may have refractive power. For example, the third lens 730 may have negative refractive power. The third lens 730 may have the convex object-side surface and the concave image-side surface. The third lens 730 may have the spherical surface. For example, both surfaces of the third lens 730 may be spherical. The fourth lens 740 may have refractive power. For example, the fourth lens 740 may have negative refractive power. The fourth lens 740 may have the convex object-side surface and the concave image-side surface. The fourth lens 740 may have the aspherical surface. For example, both surfaces of the fourth lens 740 may be aspherical.

Next, the first prism P1 and the second prism P2 which are the optical path folding members are described. For reference, the prism described below is one type of the optical path folding member described in the claims, and may be changed to another member.

The first prism P1 and the second prism P2 may be disposed so that light incident through the first lens 710 to the fourth lens 740 is imaged on the imaging plane IP. For example, the first prism P1 and the second prism P2 may be sequentially disposed along the optical path between the second lens 720 and the imaging plane IP.

The first prism P1 may have the triangular cross section. For example, the cross section of the first prism cut in the optical path direction may have the right-angled triangle shape. The incident surface S5 of the first prism P1 and the projection surface S7 of the first prism P1 may form the substantially right angle. For example, the incident surface S5 of the first prism P1 and the projection surface S7 of the first prism P1 may respectively be formed in a portion other than the hypotenuse in the cross-sectional shape of the right-angled triangle.

The first prism P1 may include the reflective surface. For example, the first prism P1 may include one first reflective surface S6. The first reflective surface S6 may enable total reflection. For example, the first angle of incidence θ1 of the first reflective surface S6 may be greater than the critical angle of the first reflective surface S6. In more detail, the first angle of incidence θ1 may be 45 degrees which is greater than 41.2 degrees, that is, the critical angle of the first reflective surface S6. The first prism P1 configured as described above may reflect light incident from the second lens 720 to the second prism P2.

The second prism P2 may have the triangular cross section. For example, the cross section of the second prism cut in the optical path direction may have the right-angled triangle shape. The second prism P2 may include the plurality of reflective surfaces. For example, the second prism P2 may include the second reflective surface S13 and the third reflective surface S14.

The second prism P2 may enable total reflection and specular reflection. For example, the second reflective surface S13 of the second prism P2 may enable total reflection, and the third reflective surface S14 of the second prism P2 may enable specular reflection or mirror reflection. As a specific example, the second angle of incidence θ2 of the second reflective surface S13 may be greater than the critical angle of the second reflective surface S13, and the third angle of incidence θ3 of the third reflective surface S14 may be less than the critical angle of the third reflective surface S14.

The second reflective surface S13 and the third reflective surface S14 may form the acute angle. For example, the angle θp2 between the second reflective surface S13 and the third reflective surface S14 may be 16 to 32 degrees. The second reflective surface S13 and the third reflective surface S14 may have the predetermined angle between the incident surface S12 of the second prism P2. For example, the angle between the second reflective surface S13 and the incident surface S12 of the second prism P2 may be 58 to 74 degrees, and the angle between the third reflective surface S14 and the incident surface S12 of the second prism P2 may be approximately 90 degrees.

The second prism P2 may enable the plurality of internal reflections. For example, light incident through the incident surface S12 of the second prism P2 may be reflected by the second reflective surface S13 and then re-reflected by the third reflective surface S14.

One surface of the second prism P2 may enable both the reflection and projection. For example, the second reflective surface S13 of the second prism P2 may transmit light incident from the third reflective surface S14 while reflecting light incident through the incident surface S12 to the third reflective surface S14.

The first to third reflective surfaces S6, S13 and S14 of the first prism P1 and the second prism P2 may have the predetermined size relationship therebetween. For example, the first angle of incidence θ1 may be less than the second angle of incidence θ2, and the third angle of incidence θ3 may be less than the first angle of incidence θ1.

The first prism P1 and the second prism P2 which are configured as described above may make the imaging lens system 700 small and integrated by folding the optical path connected from the object side to the imaging plane. For example, the first prism P1 may fold the optical path extended along the first optical axis C1 in the direction of the second optical axis C2 intersecting the first optical axis C1, thereby reducing a length of the imaging lens system 700 in the direction of the first optical axis C1. In another example, the second prism P2 may fold the optical path extended along the second optical axis C2 twice or more through total reflection and the mirror reflection, thereby reducing a length of the imaging lens system 700 in the direction of the second optical axis C2.

The filter IF and the imaging plane IP may be disposed on one side of the second prism P2. For example, the filter IF and the imaging plane IP may be disposed to face the hypotenuse having the largest length in the cross-sectional shape of the second prism P2. As a specific example, the filter IF and the imaging plane IP may be disposed to face the second reflective surface S13 of the second prism P2.

The filter IF may block light of the specific wavelength. For example, the filter IF according to the present example embodiment may block the infrared light. However, a type of light blocked by the filter IF is not limited to the infrared light. For example, the filter IF may block the ultraviolet or visible light.

The imaging plane IP may be positioned at the point where light reflected by the third reflective surface S14 converges or forms an image, and may be formed by the image sensor IS or the like. For example, the imaging plane IP may be formed on or inside the image sensor IS.

Figure 18:
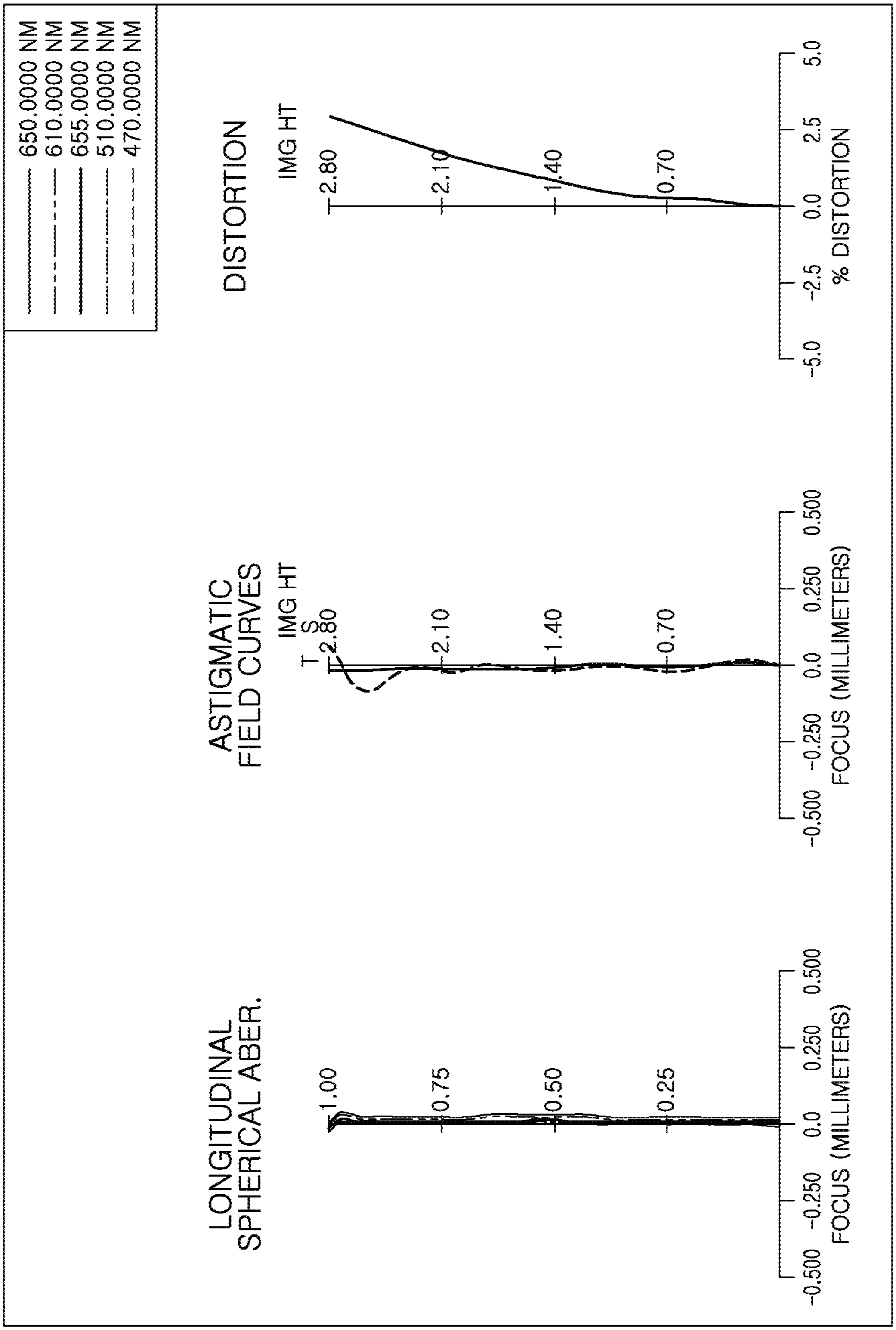
FIG. 18 is an aberration curve of the imaging lens system illustrated in FIG. 17.

The imaging lens system 700 configured as above may show aberration characteristics illustrated in FIG. 18. Tables 13 and 14 show the lens characteristics and aspheric values, respectively, of the imaging lens system according to the present example embodiment.

TABLE 13

| Surface no. | Component | Radius of curvature | Thickness/ Distance | Refractive index | Abbe number |
|---|---|---|---|---|---|
| S1 | First lens | 5.1215 | 0.900 | 1.537 | 55.7 |
| S2 | | −32.3976 | 0.050 | | |
| S3 | Second lens | 14.7066 | 0.500 | 1.669 | 20.3 |
| S4 | | 9.2838 | 0.800 | | |
| S5 | First prism | Infinity | 1.600 | 1.723 | 29.5 |
| S6 | | Infinity | 1.600 | 1.723 | 29.5 |
| S7 | | Infinity | 1.500 | | |
| S8 | Third lens | 19.9645 | 0.500 | 1.669 | 20.3 |
| S9 | | 7.7008 | 0.287 | | |
| S10 | Fourth lens | 10.6399 | 0.800 | 1.537 | 55.7 |
| S11 | | 6.3130 | 0.800 | | |
| S12 | Second prism | Infinity | 3.500 | 1.839 | 37.3 |
| S13 | | Infinity | 2.200 | 1.839 | 37.3 |
| S14 | | Infinity | 1.100 | 1.839 | 37.3 |
| S13 | | Infinity | 0.500 | | |
| S15 | Filter | Infinity | 0.210 | 1.519 | 64.2 |
| S16 | | Infinity | 0.286 | | |
| S17 | Imaging plane | Infinity | 0.010 | | |

TABLE 14

| Surface no. | S1 | S2 | S3 | S4 | S8 | S9 | S10 | S11 |
|---|---|---|---|---|---|---|---|---|
| K | 3.12E−01 | −9.90E+01 | 2.82E+01 | −6.68E−01 | −9.35E+01 | 3.72E+00 | 3.18E+01 | −9.89E+00 |
| A | 2.00E−05 | −6.28E−03 | 2.16E−02 | 1.24E−02 | 0 | 0 | −3.75E−03 | −3.70E−03 |
| B | 2.18E−04 | 1.53E−02 | −1.01E−03 | 3.27E−04 | 0 | 0 | −3.47E−04 | −5.58E−04 |
| C | −1.14E−04 | −1.48E−02 | 1.87E−04 | 1.51E−04 | 0 | 0 | −1.09E−04 | −2.32E−04 |
| D | 3.27E−05 | 7.97E−03 | 6.33E−04 | −5.14E−05 | 0 | 0 | −3.87E−05 | −1.09E−04 |
| E | −7.09E−06 | −2.60E−03 | −2.31E−04 | 8.40E−04 | 0 | 0 | −2.21E−05 | −6.50E−05 |
| F | 5.71E−07 | 5.20E−04 | −2.65E−04 | −8.91E−04 | 0 | 0 | −8.55E−06 | −4.15E−05 |
| G | −4.16E−08 | −6.19E−05 | −2.90E−05 | −2.81E−04 | 0 | 0 | −1.61E−06 | −2.84E−05 |
| H | 1.03E−09 | 4.04E−06 | 0 | 0 | 0 | 0 | 0 | 0 |
| J | 1.54E−09 | −1.16E−07 | 0 | 0 | 0 | 0 | 0 | 0 |

Figure 19:
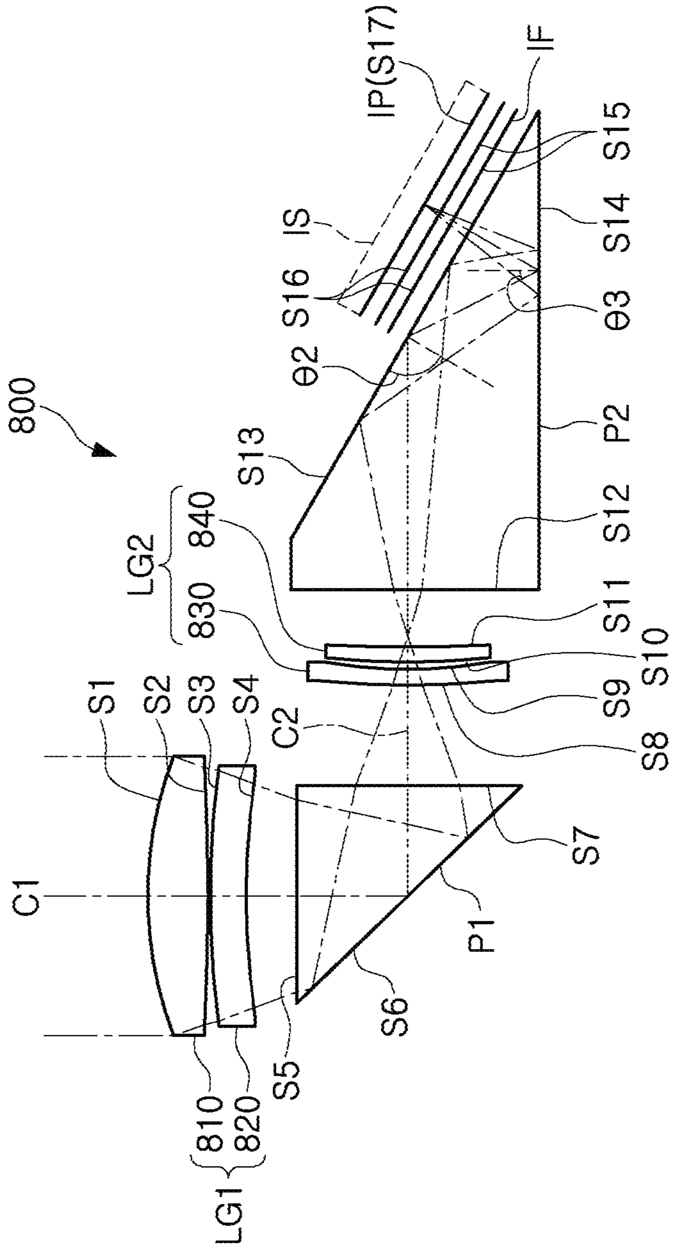
FIG. 19 is a block diagram of an imaging lens system according to an eighth example embodiment.

Next, the imaging lens system according to the eighth example embodiment is described with reference to FIG. 19.

An imaging lens system 800 according to the present example embodiment may include a first lens group LG1, the first prism P1, a second lens group LG2 and the second prism P2. However, the components of the imaging lens system 800 are not limited to the above-described members. For example, the imaging lens system 800 may further include the filter IF and the imaging plane IP. The first lens group LG1, the first prism P1, the second lens group LG2 and the second prism P2 may be sequentially arranged from the object side. For example, the first lens group LG1 may be disposed on the object side of the first prism P1, and the second lens group LG2 may be disposed between the first prism P1 and the second prism P2.

Next, the above-described components are described in order.

The first lens group LG1 may include a plurality of lenses. For example, the first lens group LG1 may include a first lens 810 and a second lens 820 sequentially disposed from the object side. The first lens 810 and the second lens 820 may be disposed at a predetermined interval. For example, an image-side surface of the first lens 810 may not be in contact with an object-side surface of the second lens 820. However, the first lens 810 and the second lens 820 may not necessarily be disposed so as not to be in contact with each other. For example, the image-side surface of the first lens 810 may be in contact with the object-side surface of the second lens 820.

The second lens group LG2 may include a plurality of lenses. For example, the second lens group LG2 may include a third lens 830 and a fourth lens 840 sequentially disposed from the object side. The third lens 830 and the fourth lens 840 may be disposed at a predetermined interval. For example, an image-side surface of the third lens 830 may not be in contact with an object-side surface of the fourth lens 840. However, the third lens 830 and the fourth lens 840 may not necessarily be disposed so as not to be in contact with each other. For example, the image-side surface of the third lens 830 may be in contact with the object-side surface of the fourth lens 840.

Next, characteristics of the first lens 810 to the fourth lens 840 included in the first lens group LG1 and the second lens group LG2 are described.

The first lens 810 may have refractive power. For example, the first lens 810 may have the positive refractive power. The first lens 810 may have the convex object-side surface and the convex image-side surface. The first lens 810 may have the spherical surface and the aspherical surface. For example, an object-side surface of the first lens 810 may be spherical, and an image-side surface thereof may be aspherical. The second lens 820 may have refractive power. For example, the second lens 820 may have negative refractive power. The second lens 820 may have the convex object-side surface and the concave image-side surface. The second lens 820 may have the aspherical surface. For example, both surfaces of the second lens 820 may be aspherical. The third lens 830 may have refractive power. For example, the third lens 830 may have negative refractive power. The third lens 830 may have the convex object-side surface and the concave image-side surface. The third lens 830 may have the aspherical surface. For example, both surfaces of the third lens 830 may be aspherical. The fourth lens 840 may have refractive power. For example, the fourth lens 840 may have the positive refractive power. The fourth lens 840 may have the convex object-side surface and the concave image-side surface. The fourth lens 840 may have the aspherical surface. For example, both surfaces of the fourth lens 840 may be aspherical.

Next, the first prism P1 and the second prism P2 which are the optical path folding members are described. For reference, the prism described below is one type of the optical path folding member described in the claims, and may be changed to another thereof.

The first prism P1 and the second prism P2 may be disposed so that light incident through the first lens 810 to the fourth lens 840 is imaged on the imaging plane IP. For example, the first prism P1 and the second prism P2 may be sequentially disposed along the optical path between the second lens 820 and the imaging plane IP.

The first prism P1 may have the triangular cross section. For example, the cross section of the first prism cut in the optical path direction may have the right-angled triangle shape. The incident surface S5 of the first prism P1 and the projection surface S7 of the first prism P1 may form the substantially right angle. For example, the incident surface S5 of the first prism P1 and the projection surface S7 of the first prism P1 may respectively be formed in a portion other than the hypotenuse in the cross-sectional shape of the right-angled triangle.

The first prism P1 may include the reflective surface. For example, the first prism P1 may include one first reflective surface S6. The first reflective surface S6 may enable total reflection. For example, the first angle of incidence θ1 of the first reflective surface S6 may be greater than the critical angle of the first reflective surface S6. In more detail, the first angle of incidence θ1 may be 45 degrees which is greater than 41.2 degrees, that is, the critical angle of the first reflective surface S6. The first prism P1 configured as described above may reflect light incident from the second lens 820 to the second prism P2.

The second prism P2 may have the triangular cross section. For example, the cross section of the second prism cut in the optical path direction may have the right-angled triangle shape. The second prism P2 may include the plurality of reflective surfaces. For example, the second prism P2 may include the second reflective surface S13 and the third reflective surface S14.

The second prism P2 may enable total reflection and specular reflection. For example, the second reflective surface S13 of the second prism P2 may enable total reflection, and the third reflective surface S14 of the second prism P2 may enable specular reflection or mirror reflection. As a specific example, the second angle of incidence θ2 of the second reflective surface S13 may be greater than the critical angle of the second reflective surface S13, and the third angle of incidence θ3 of the third reflective surface S14 may be less than the critical angle of the third reflective surface S14.

The second reflective surface S13 and the third reflective surface S14 may form the acute angle. For example, the angle θp2 between the second reflective surface S13 and the third reflective surface S14 may be 16 to 32 degrees. The second reflective surface S13 and the third reflective surface S14 may have the predetermined angle between the incident surface S12 of the second prism P2. For example, the angle between the second reflective surface S13 and the incident surface S12 of the second prism P2 may be 58 to 74 degrees, and the angle between the third reflective surface S14 and the incident surface S12 of the second prism P2 may be approximately 90 degrees.

The second prism P2 may enable the plurality of internal reflections. For example, light incident through the incident surface S12 of the second prism P2 may be reflected by the second reflective surface S13 and then re-reflected by the third reflective surface S14.

One surface of the second prism P2 may enable both the reflection and projection. For example, the second reflective surface S13 of the second prism P2 may transmit light incident from the third reflective surface S14 while reflecting light incident through the incident surface S12 to the third reflective surface S14.

The first to third reflective surfaces S6, S13 and S14 of the first prism P1 and the second prism P2 may have the predetermined size relationship therebetween. For example, the first angle of incidence θ1 may be less than the second angle of incidence θ2, and the third angle of incidence θ3 may be less than the first angle of incidence θ1.

The first prism P1 and the second prism P2 which are configured as described above may make the imaging lens system 800 small and integrated by folding the optical path connected from the object side to the imaging plane. For example, the first prism P1 may fold the optical path extended along the first optical axis C1 in the direction of the second optical axis C2 intersecting the first optical axis C1, thereby reducing a length of the imaging lens system 800 in the direction of the first optical axis C1. In another example, the second prism P2 may fold the optical path extended along the second optical axis C2 twice or more through total reflection and the mirror reflection, thereby reducing a length of the imaging lens system 800 in the direction of the second optical axis C2.

The filter IF and the imaging plane IP may be disposed on one side of the second prism P2. For example, the filter IF and the imaging plane IP may be disposed to face the hypotenuse having the largest length in the cross-sectional shape of the second prism P2. As a specific example, the filter IF and the imaging plane IP may be disposed to face the second reflective surface S13 of the second prism P2.

The filter IF may block light of the specific wavelength. For example, the filter IF according to the present example embodiment may block the infrared light. However, a type of light blocked by the filter IF is not limited to the infrared light. For example, the filter IF may block the ultraviolet or visible light.

The imaging plane IP may be positioned at the point where light reflected by the third reflective surface S14 converges or forms an image, and may be formed by the image sensor IS or the like. For example, the imaging plane IP may be formed on or inside the image sensor IS.

Figure 20:
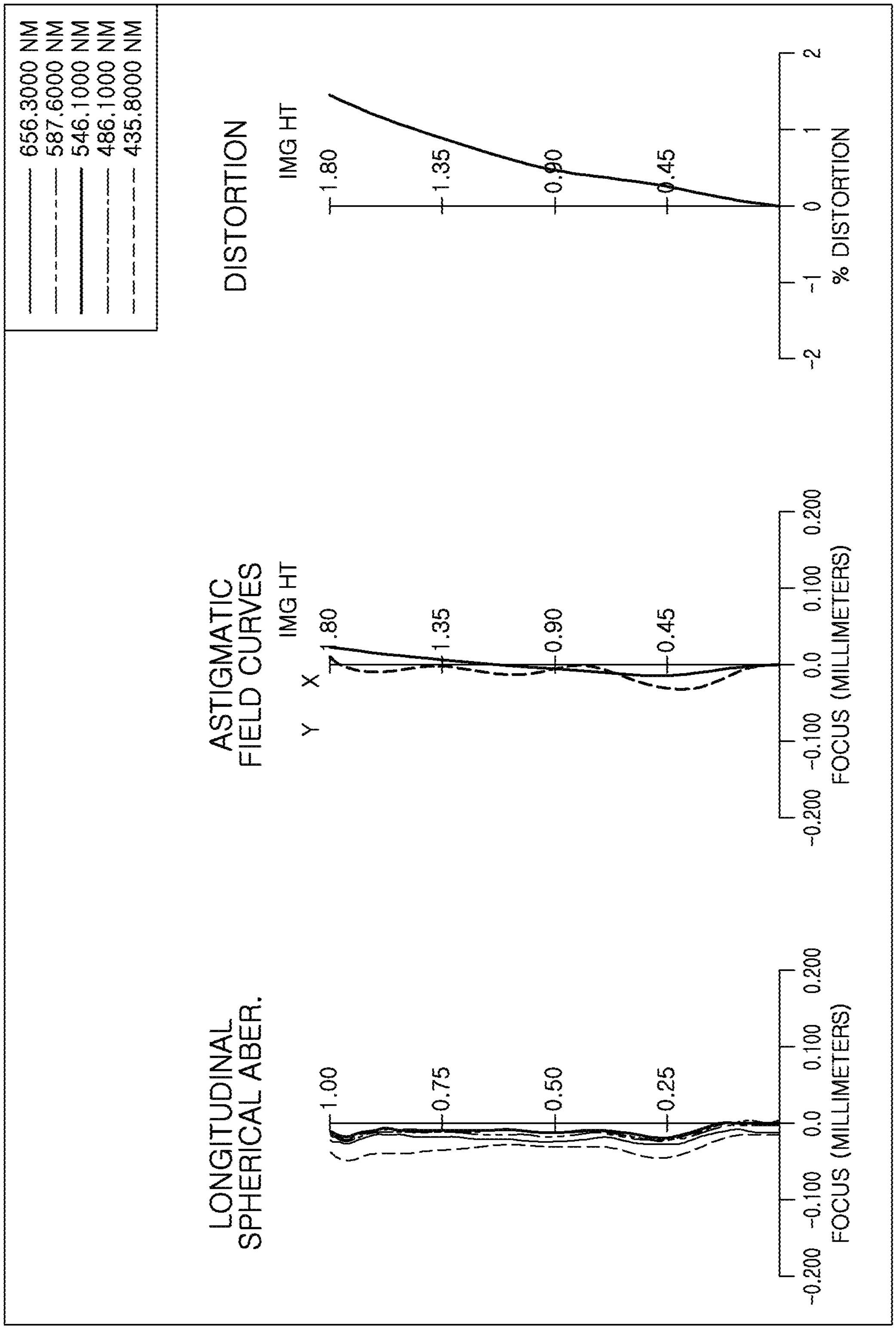
FIG. 20 is an aberration curve of the imaging lens system illustrated in FIG. 19.

The imaging lens system 800 configured as above may show aberration characteristics illustrated in FIG. 20. Tables 15 and 16 show the lens characteristics and aspheric values, respectively, of the imaging lens system according to the present example embodiment.

TABLE 15

| Surface no. | Component | Radius of curvature | Thickness/ Distance | Refractive index | Abbe number |
|---|---|---|---|---|---|
| S1 | First lens | 5.1332 | 0.900 | 1.537 | 55.7 |
| S2 | | −31.9856 | 0.050 | | |
| S3 | Second lens | 14.7747 | 0.500 | 1.669 | 20.3 |
| S4 | | 9.9040 | 0.800 | | |
| S5 | First prism | Infinity | 1.600 | 1.723 | 29.5 |
| S6 | | Infinity | 1.600 | 1.723 | 29.5 |
| S7 | | Infinity | 1.500 | | |
| S8 | Third lens | 21.0196 | 0.200 | 1.669 | 20.3 |
| S9 | | 6.5300 | 0.100 | | |
| S10 | Fourth lens | 10.0000 | 0.233 | 1.537 | 55.7 |

TABLE 15-continued

| Surface no. | Component | Radius of curvature | Thickness/ Distance | Refractive index | Abbe number |
|---|---|---|---|---|---|
| S11 | | 15.0000 | 0.800 | | |
| S12 | Second prism | Infinity | 3.500 | 1.839 | 37.3 |
| S13 | | Infinity | 2.200 | 1.839 | 37.3 |
| S14 | | Infinity | 1.100 | 1.839 | 37.3 |
| S13 | | Infinity | 0.300 | | |
| S15 | Filter | Infinity | 0.210 | 1.519 | 64.2 |
| S16 | | Infinity | 0.280 | | |
| S17 | Imaging plane | Infinity | 0.020 | | |

TABLE 16

| Surface | S1 | S2 | S3 | S4 | S8 | S9 | S10 | S11 |
|---|---|---|---|---|---|---|---|---|
| K | 3.2E−01 | −9.90E+01 | 2.80E+01 | 9.60E−02 | 9.35E+01 | −3.30E+00 | −3.16E+01 | 4.27E+01 |
| A | 0 | −6.00E−03 | −6.00E−03 | 2.00E−03 | −1.00E−03 | 0 | 6.00E−03 | 2.00E−02 |
| B | 0 | 1.50E−02 | −2.00E−03 | −2.30E−02 | 0 | 0 | −6.90E−02 | −1.09E−01 |
| C | 0 | −1.50E−02 | 1.20E−02 | 4.60E−02 | 0 | 0 | 1.76E−01 | 2.79E−01 |
| D | 0 | 8.00E−03 | −1.70E−02 | −5.20E−02 | 0 | 0 | −2.97E−01 | −4.49E−01 |
| E | 0 | −3.00E−03 | 1.20E−02 | 3.60E−02 | 0 | 0 | 3.24E−01 | 4.58E−01 |
| F | 0 | 1.00E−03 | −5.00E−03 | −1.50E−02 | 0 | 0 | −2.24E−01 | −2.96E−01 |
| G | 0 | 0 | 1.00E−03 | 4.00E−03 | 0 | 0 | 9.40E−02 | 1.17E−01 |
| H | 0 | 0 | 0 | −1.00E−03 | −6.81E−07 | −1.04E−06 | −2.20E−02 | −2.57E−02 |
| J | 0 | 0 | 0 | 0 | −2.49E−07 | −4.07E−07 | 2.16E−03 | 2.39E−03 |

Tables 17 and 18 show the optical characteristic values and conditional expression values, respectively, of the imaging lens systems according to the above-described first to eighth example embodiments.

TABLE 17

| Item | First example embodiment | Second example embodiment | Third example embodiment | Fourth example embodiment | Fifth example embodiment | Sixth example embodiment | Seventh example embodiment | Eighth example embodiment |
|---|---|---|---|---|---|---|---|---|
| f1 | 9.4868 | 8.2128 | 8.9029 | 7.9152 | 8.5237 | 8.6174 | 8.3001 | 8.3026 |
| f2 | −7.4083 | −7.5892 | −7.6349 | −9.1133 | −22.9927 | −52.7134 | −39.0968 | −46.8551 |
| f3 | 20.4671 | 17.1700 | 19.4022 | 16.6057 | −61.9507 | −13.0921 | −19.0590 | −14.2452 |
| f4 | — | — | 27.9979 | — | — | −73.4655 | −30.8872 | 54.9374 |
| TTL | 24.5968 | 19.2220 | 20.0862 | 20.0619 | 16.8621 | 17.2752 | 17.1432 | 15.8931 |
| BFL | 19.8927 | 15.2220 | 9.1468 | 9.4393 | 8.5121 | 7.8583 | 8.6064 | 8.4100 |
| f | 22.8127 | 15.6362 | 22.8127 | 13.5730 | 14.1053 | 14.1053 | 14.3526 | 12.4162 |
| ImgHT | 1.5000 | 1.5000 | 1.5000 | 1.5000 | 1.5000 | 2.8000 | 2.8000 | 1.8000 |
| PID | 7.5000 | 6.7500 | 7.2500 | 7.2500 | 6.0000 | 6.5000 | 6.8000 | 6.8000 |

TABLE 18

| Conditional expression | First example embodiment | Second example embodiment | Third example embodiment | Fourth example embodiment | Fifth example embodiment | Sixth example embodiment | Seventh example embodiment | Eighth example embodiment |
|---|---|---|---|---|---|---|---|---|
| BFL/TTL | 0.8088 | 0.7919 | 0.4554 | 0.4705 | 0.5048 | 0.4549 | 0.5020 | 0.5292 |
| V1 − V2 | 33.5098 | 32.1906 | 32.1906 | 32.1906 | 32.1906 | 35.3645 | 35.3645 | 35.3645 |
| TTL/f | 1.0782 | 1.2293 | 0.8805 | 1.4781 | 1.1954 | 1.2247 | 1.1944 | 1.2800 |
| TTL/f1 | 2.5927 | 2.3405 | 2.2562 | 2.5346 | 1.9783 | 2.0047 | 2.0654 | 1.9142 |
| TTL/f2 | −3.3202 | −2.5328 | −2.6308 | −2.2014 | −0.7334 | −0.3277 | −0.4385 | −0.3392 |
| TTL/f3 | 1.2018 | 1.1195 | 1.0353 | 1.2081 | −0.2722 | −1.3195 | −0.8995 | −1.1157 |
| TTL/f4 | — | — | 0.7174 | — | — | −0.2351 | −0.5550 | 0.2893 |
| BFL/f | 0.8720 | 0.9735 | 0.4010 | 0.6954 | 0.6035 | 0.5571 | 0.5996 | 0.6773 |
| BFL/f1 | 2.0969 | 1.8535 | 1.0274 | 1.1926 | 0.9986 | 0.9119 | 1.0369 | 1.0129 |
| BFL/f2 | −2.6852 | −2.0057 | −1.1980 | −1.0358 | −0.3702 | −0.1491 | −0.2201 | −0.1795 |
| BFL/f3 | 0.9719 | 0.8865 | 0.4714 | 0.5684 | −0.1374 | −0.6002 | −0.4516 | −0.5904 |
| BFL/f4 | — | — | 0.3267 | — | — | −0.1070 | −0.2786 | 0.1531 |
| PID/ImgHT | 5.0000 | 4.5000 | 4.8333 | 4.8333 | 4.0000 | 2.3214 | 2.4286 | 3.7778 |

Next, the electronic device according to the present disclosure is described.

The electronic device according to the present disclosure may include the imaging lens system according to an example embodiment. For example, the electronic device may include one or more of the imaging lens systems according to the first to eighth example embodiments. As a specific example, the electronic device may include the imaging lens system 100 according to the first example embodiment. In another example, the electronic device may include the imaging lens system 100 according to the first example embodiment and the imaging lens system 800 according to the eighth example embodiment. In another example, the electronic device may include two imaging lens systems 200 according to the second example embodiment and the imaging lens system 600 according to the sixth example embodiment. However, the imaging lens system which may be positioned in the electronic device according to an example embodiment is not limited to the above-described types.

Figure 21:
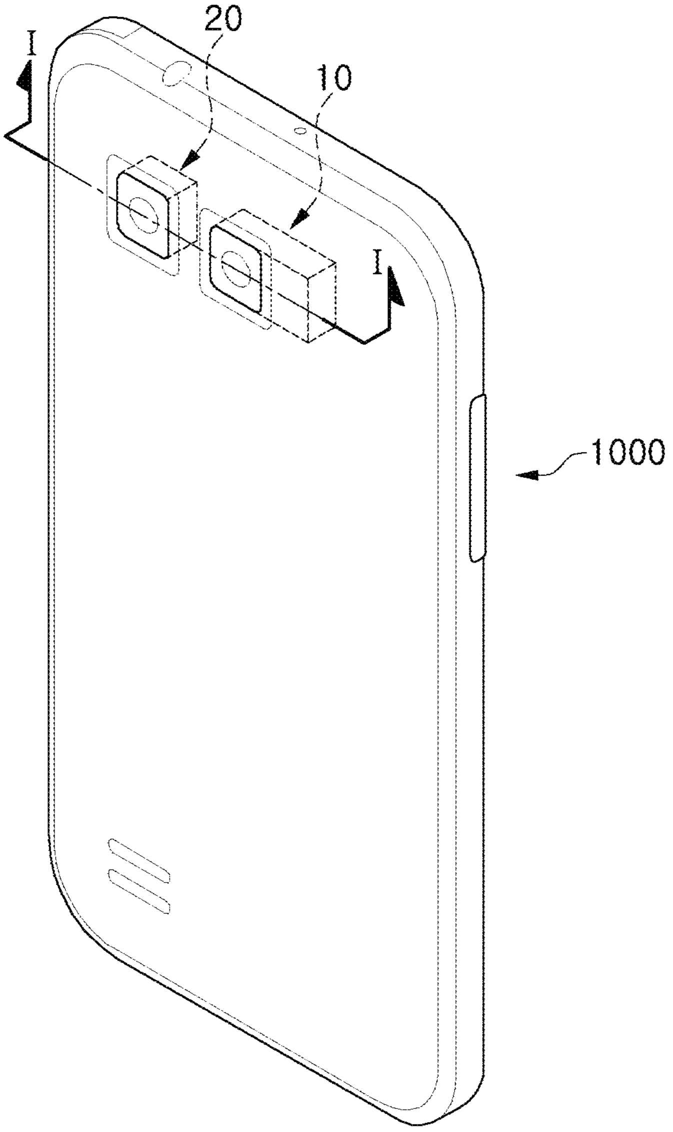
FIG. 21 is a perspective view of an electronic device according to an example embodiment.
Figure 22:
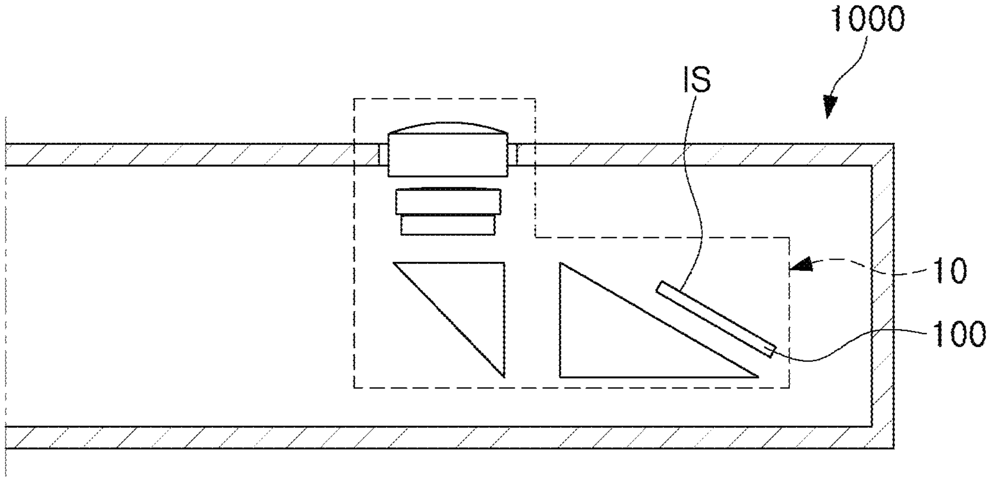
FIG. 22 is a partial cross-sectional view of the electronic device illustrated in FIG. 21.

Next, the electronic device according to an example embodiment is described with reference to FIGS. 21 and 22.

An electronic device 1000 according to an example embodiment may be the portable terminal. For example, the electronic device 1000 may be a smartphone. However, a type of the electronic device 1000 is not limited to the smartphone. For example, the electronic device according to another example embodiment may be a laptop computer.

The electronic device 1000 may include one or a plurality of camera modules 10 and 20. For example, two camera modules 10 and 20 may be mounted in the electronic device 1000. The first camera module 10 and the second camera module 20 may be disposed to image an object in the same direction. For example, the first camera module 10 and the second camera module 20 may be installed on one surface of the electronic device 1000 to be parallel to each other.

At least one of the first camera module 10 and the second camera module 20 may include the imaging lens system according to the first to eighth example embodiments. For example, the first camera module 10 may include the imaging lens system 100 according to the first example embodiment.

The first camera module 10 may implement the high resolution. In detail, the first camera module 10 may have the image sensor IS disposed diagonally with respect to a thickness direction of the electronic device 1000 as illustrated in FIG. 22, and thus have the large image sensor IS required for implementing the high resolution. In more detail, the image sensor IS may be disposed at an inclination of 18 to 30 degrees with respect to the front of the electronic device 1000 or a display device (e.g., display panel).

The electronic device 1000 configured as described above may mount the image sensor larger than (especially, a thickness of) the internal space and the camera module including the image sensor, and it is thus possible to simultaneously improve performance of the camera module and reduce a thickness of the electronic device.

As set forth above, the present disclosure may provide the imaging lens system which may be mounted in a small terminal or a thin terminal.

In addition, the present disclosure may provide the camera module having the telephoto imaging lens system.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:

a first lens comprising positive refractive power;

a second lens comprising a refractive power;

a third lens comprising a refractive power;

a first reflective surface;

a second reflective surface; and a third reflective surface;

wherein the first lens, the second lens, the third lens, the second reflective surface, and the third reflective surface are disposed in this order from an object side along an optical axis, and wherein 15 mm<TTL<26 mm, where TTL is a distance from an object-side surface of the first lens to an imaging plane.

2. The imaging lens system of claim 1, wherein the first lens has a convex object-side surface.

3. The imaging lens system of claim 1, wherein the first lens has a concave image-side surface.

4. The imaging lens system of claim 1, wherein the second lens has a convex object-side surface.

5. The imaging lens system of claim 1, wherein the second lens has a concave image-side surface.

6. The imaging lens system of claim 1, wherein the third lens has a convex object-side surface.

7. The imaging lens system of claim 1, further comprising a fourth lens disposed on an image-side surface of the third lens.

8. An imaging lens system comprising:

a first lens comprising positive refractive power;

a second lens comprising a refractive power and a concave image-side surface;

a third lens comprising a refractive power and a concave image-side surface;

a fourth lens comprising a refractive power;

a first reflective surface;

a second reflective surface; and a third reflective surface;

wherein the first lens, the second lens, the third lens, the fourth lens, the second reflective surface, and the third reflective surface are disposed in this order from an object side along an optical axis.

9. The imaging lens system of claim 8, wherein the first lens has a convex object-side surface.

10. The imaging lens system of claim 8, wherein the first lens has a concave image-side surface.

11. The imaging lens system of claim 8, wherein the second lens has a convex object-side surface.

12. The imaging lens system of claim 8, wherein the third lens has a convex object-side surface.

13. The imaging lens system of claim 8, wherein the fourth lens has a convex image-side surface.

* * * * *